US011546386B2

(12) United States Patent
Choe et al.

(10) Patent No.: US 11,546,386 B2
(45) Date of Patent: Jan. 3, 2023

(54) AUTOMATIC FORWARDING OF INCOMING CALLS BASED ON USER INTERACTION WITH DEVICES

(71) Applicant: Microsoft Technology Licensing, LLC, Redmond, WA (US)

(72) Inventors: Calvin Choe, Redmond, WA (US); Shai Guday, Redmond, WA (US); Michael Kostersitz, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 16/736,356

(22) Filed: Jan. 7, 2020

(65) Prior Publication Data

US 2020/0162521 A1 May 21, 2020

Related U.S. Application Data

(63) Continuation of application No. 15/591,919, filed on May 10, 2017, now Pat. No. 10,567,442.

(51) Int. Cl.
*H04L 65/1069* (2022.01)
*H04L 65/1016* (2022.01)
(Continued)

(52) U.S. Cl.
CPC ...... *H04L 65/1069* (2013.01); *H04L 65/1016* (2013.01); *H04L 65/1059* (2013.01); *H04L 65/1073* (2013.01); *H04L 65/1096* (2013.01); *H04M 3/42263* (2013.01); *H04M 3/543* (2013.01); *H04M 3/42365* (2013.01); *H04M 2203/2038* (2013.01)

(58) Field of Classification Search
CPC ............ H04L 65/1069; H04L 65/1016; H04L 65/1059; H04L 65/1073; H04L 65/1096; H04M 3/54–541; H04M 3/42059–42076; H04M 3/42229; H04M 3/42263–42272; H04M 3/543; H04M 3/42365; H04M 2203/2038
See application file for complete search history.

(56) References Cited

U.S. PATENT DOCUMENTS 10,567,442 B2 * 2/2020 Choe ..................... H04M 3/543

\* cited by examiner

*Primary Examiner* — Eric Myers
(74) *Attorney, Agent, or Firm* — Jacob P. Rohwer; Newport IP, LLC

(57) ABSTRACT

An automated registration service supported on an application server that interoperates with an IMS (IP Multimedia Subsystem) core network is configured to dynamically register and deregister devices that are all associated with one or more commonly-utilized phone numbers. The service may assign the phone number to registered devices and, in contrast, un-assign the phone number from deregistered devices. The registration and deregistration of the devices may occur based on the amount of interaction with the device and other real-time contextual information. Furthermore, the automated registration service intelligently determines which registered devices to forward incoming video and/or audio calls to based on various contextual information, including the capabilities of device, identified location of a user, user preferences, etc. By intelligently selecting which devices should receive an incoming call, unnecessary use of bandwidth, data, and resources (e.g., battery power) can be reduced.

20 Claims, 29 Drawing Sheets

(51) Int. Cl.
*H04L 65/1073* (2022.01)
*H04L 65/1059* (2022.01)
*H04M 3/42* (2006.01)
*H04M 3/54* (2006.01)
*H04L 65/1096* (2022.01)

500

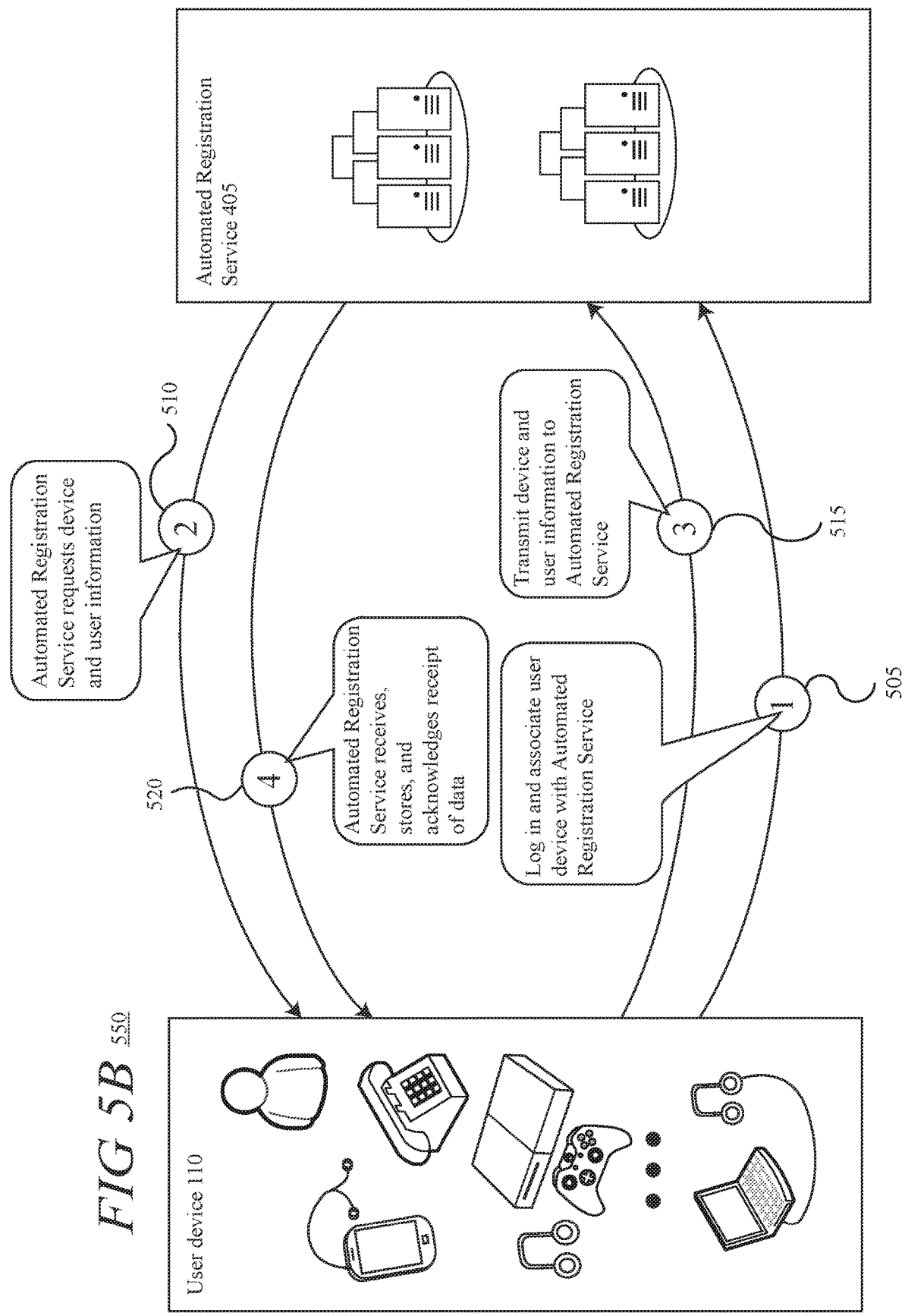

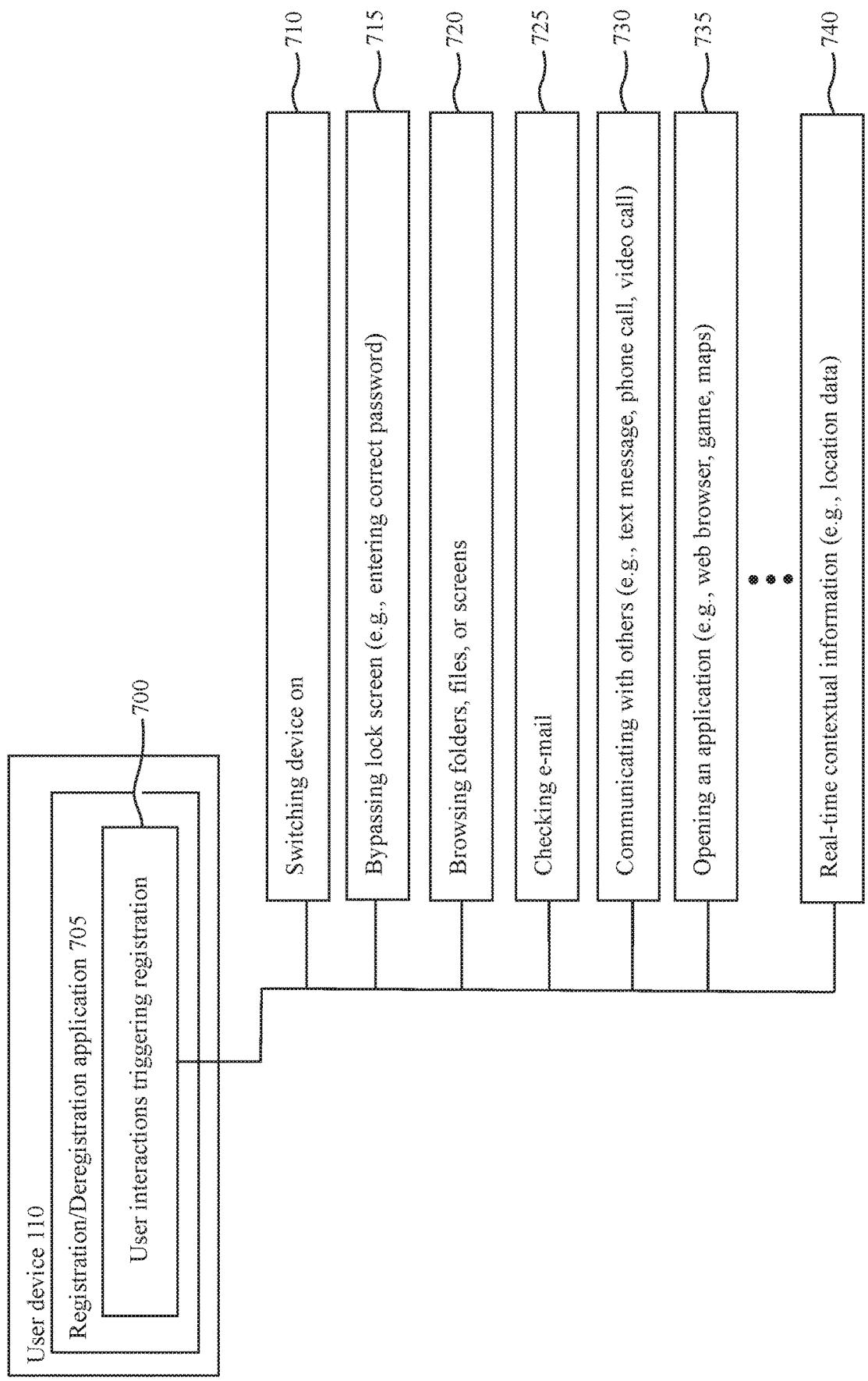

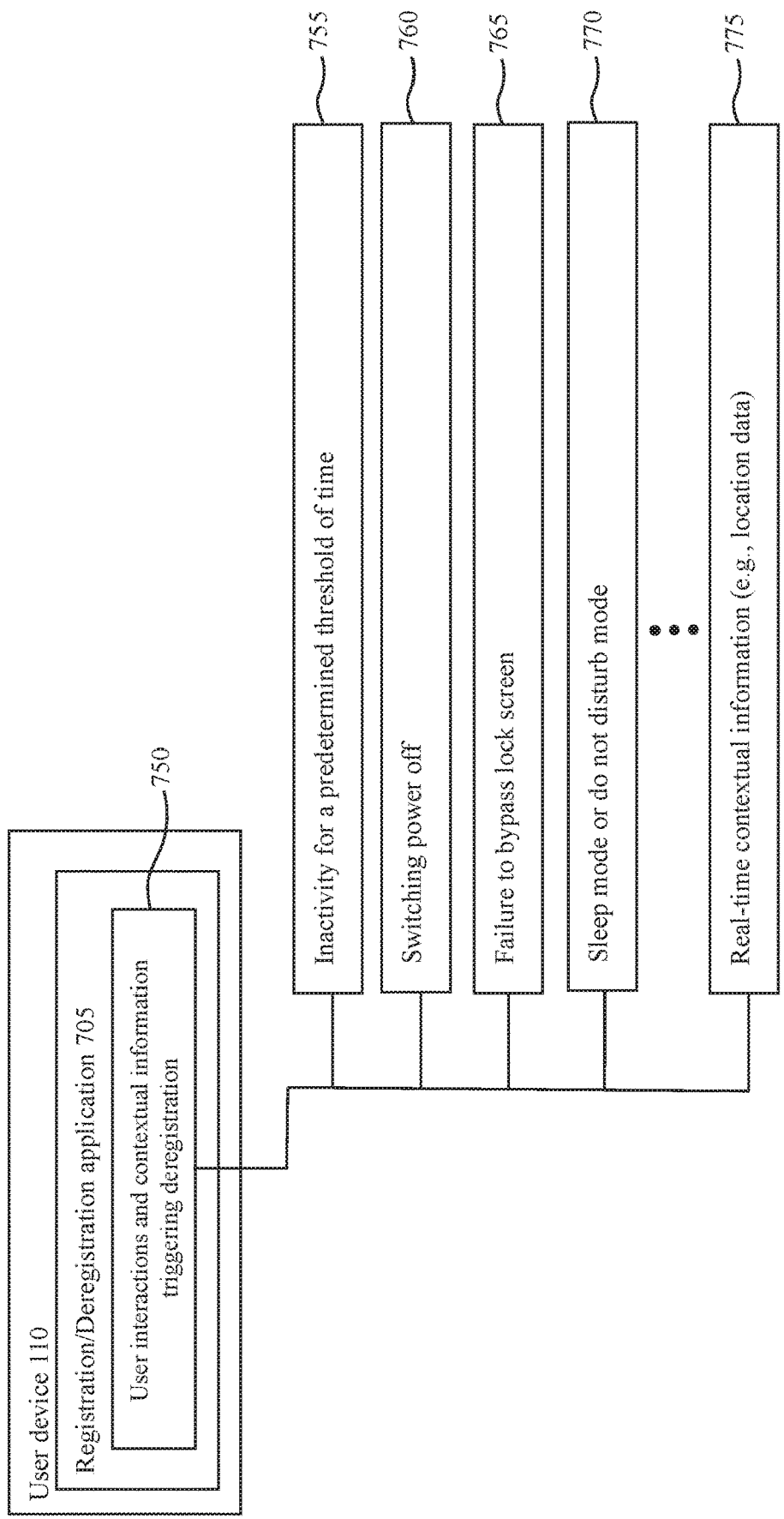

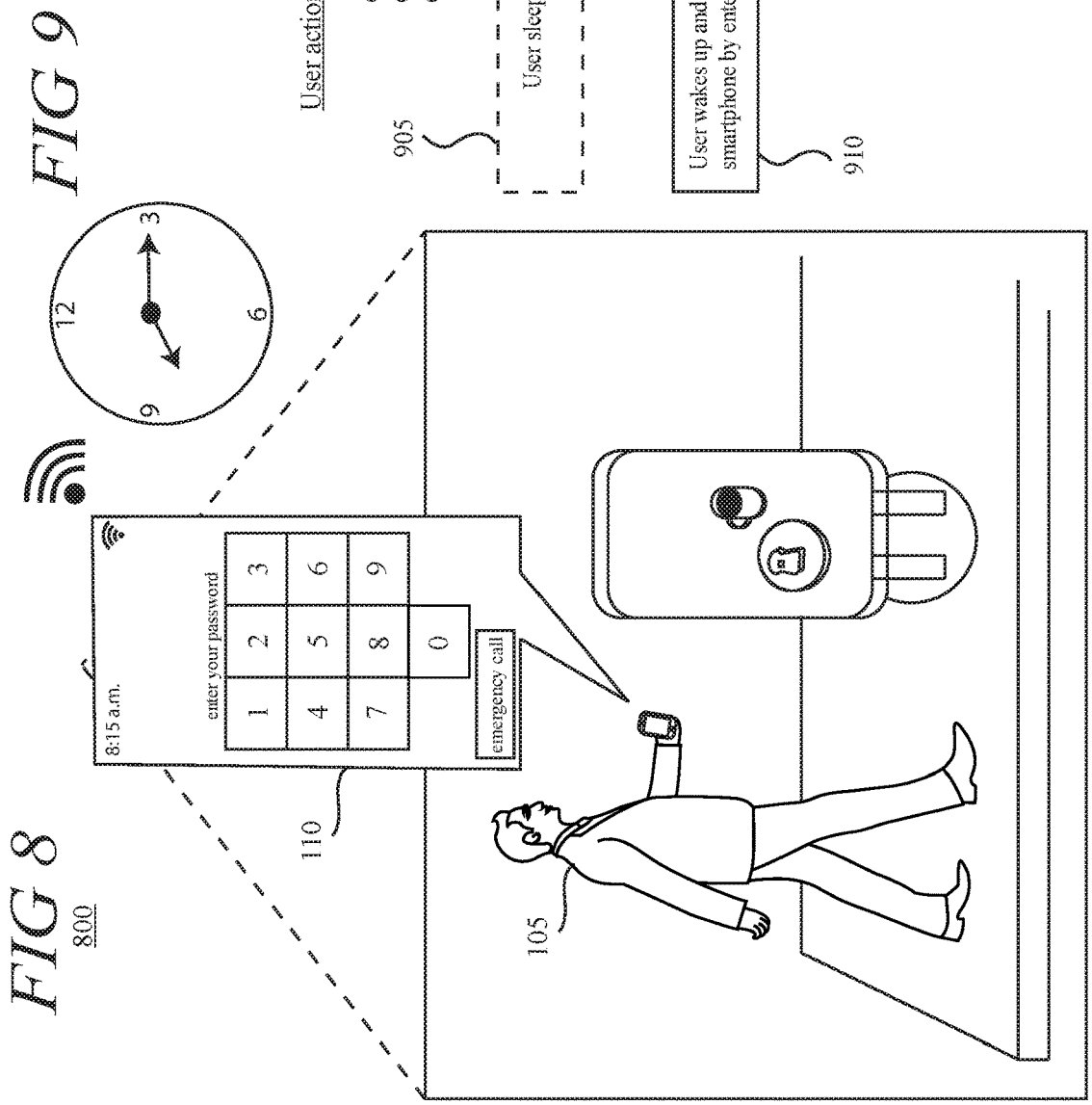

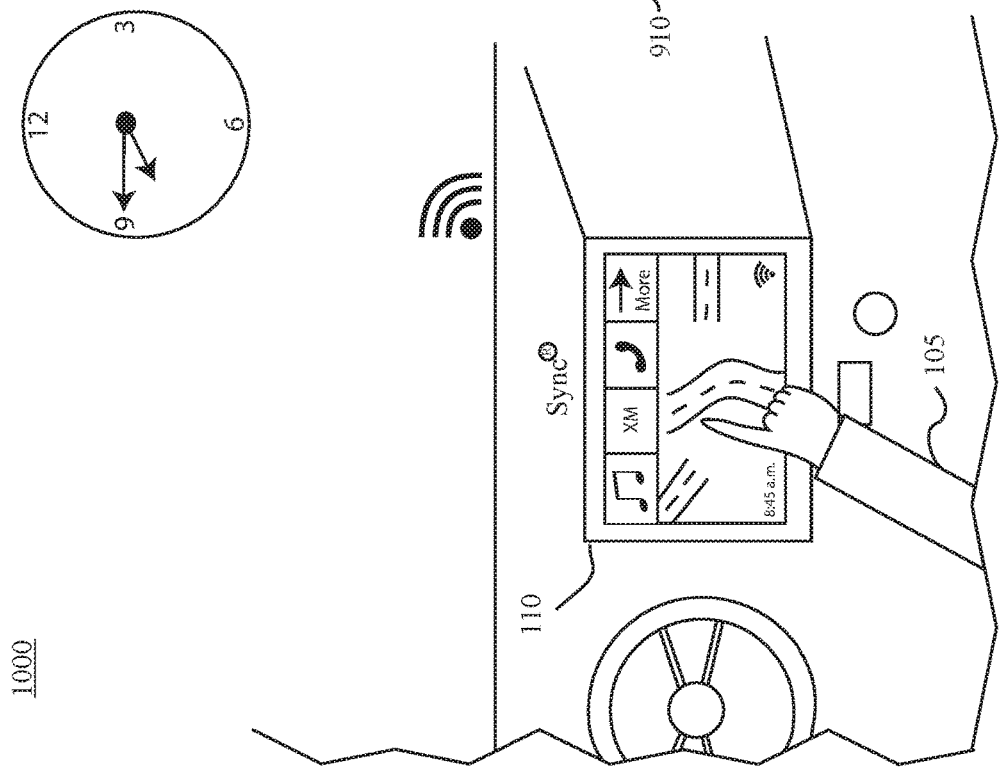

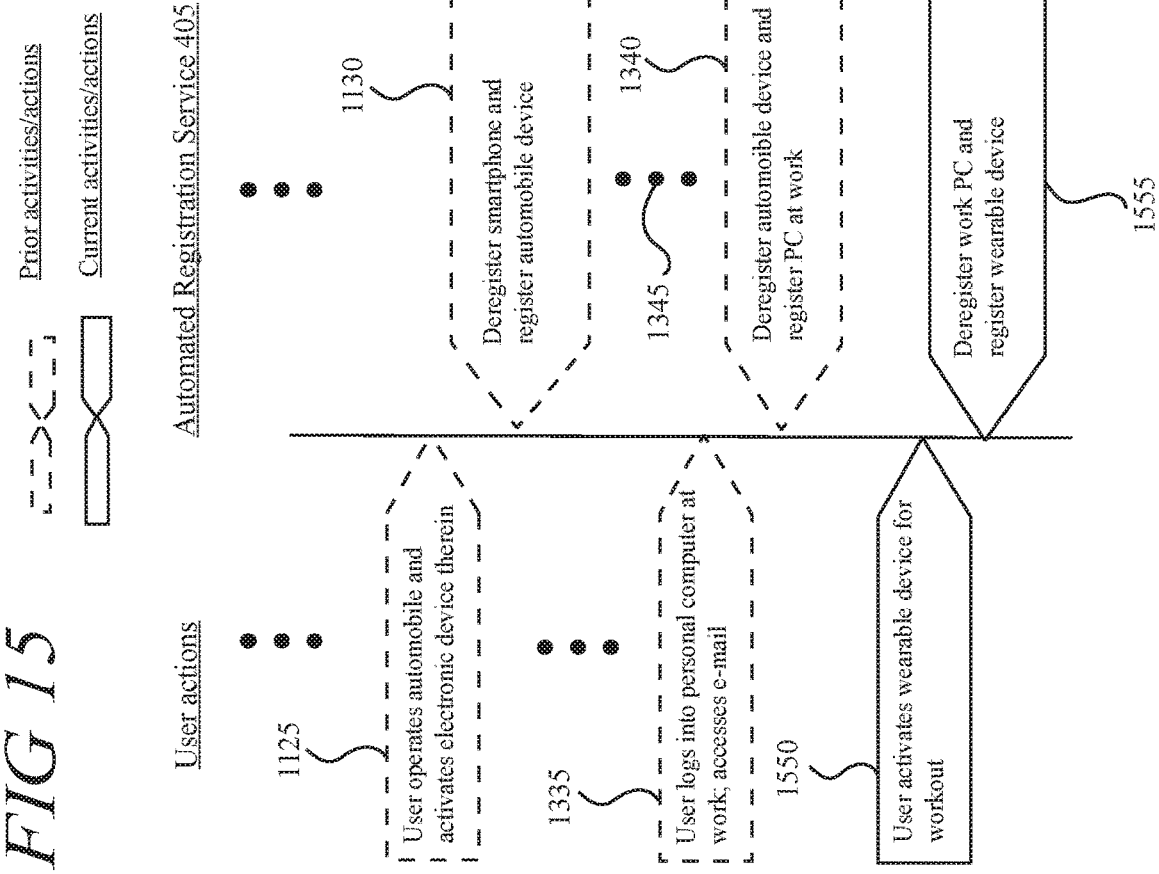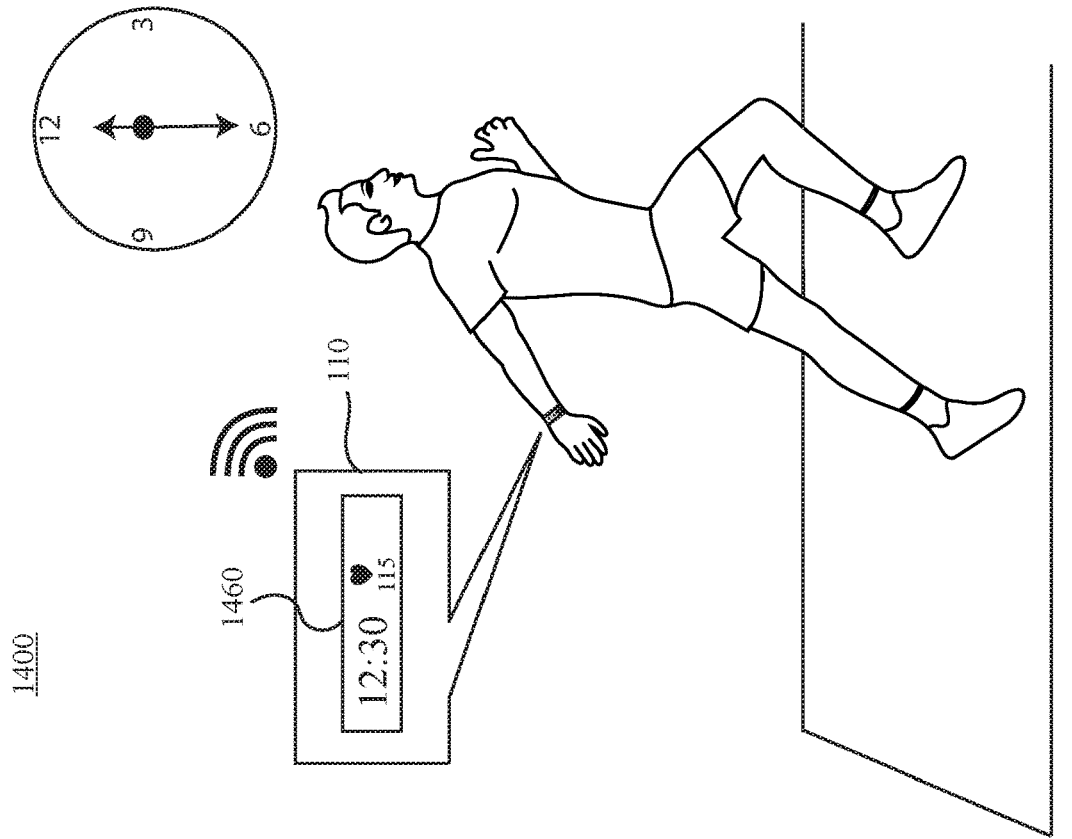

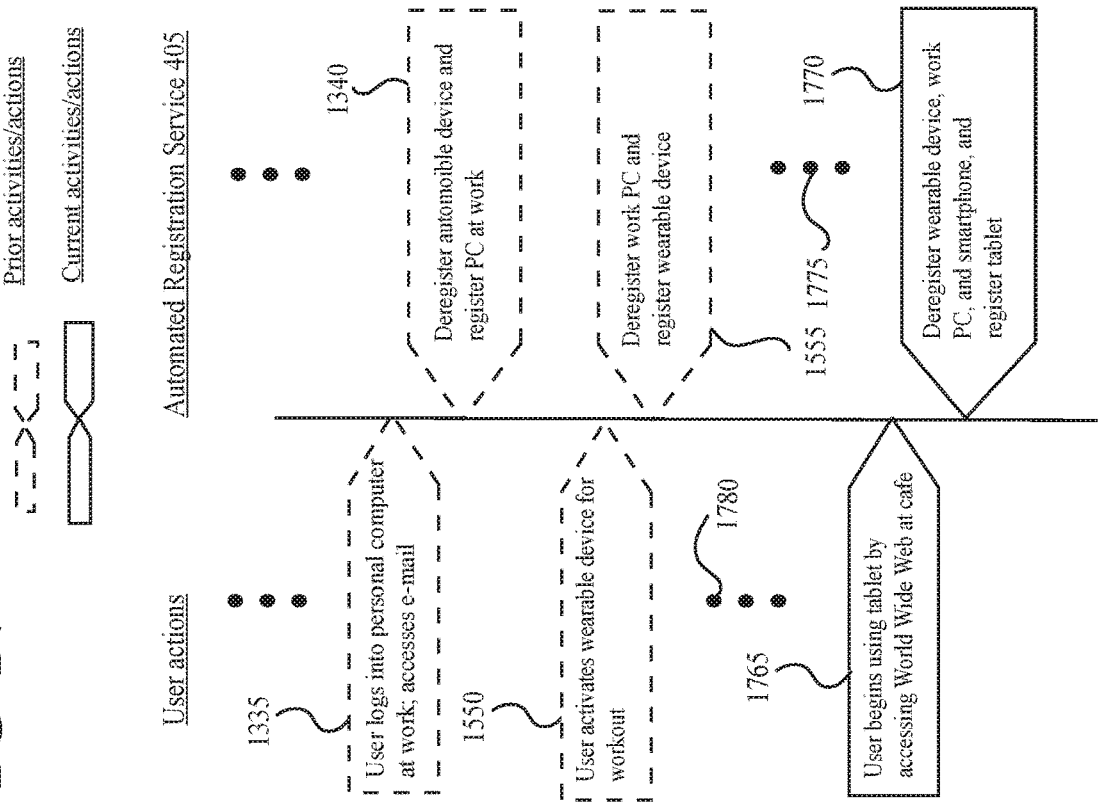
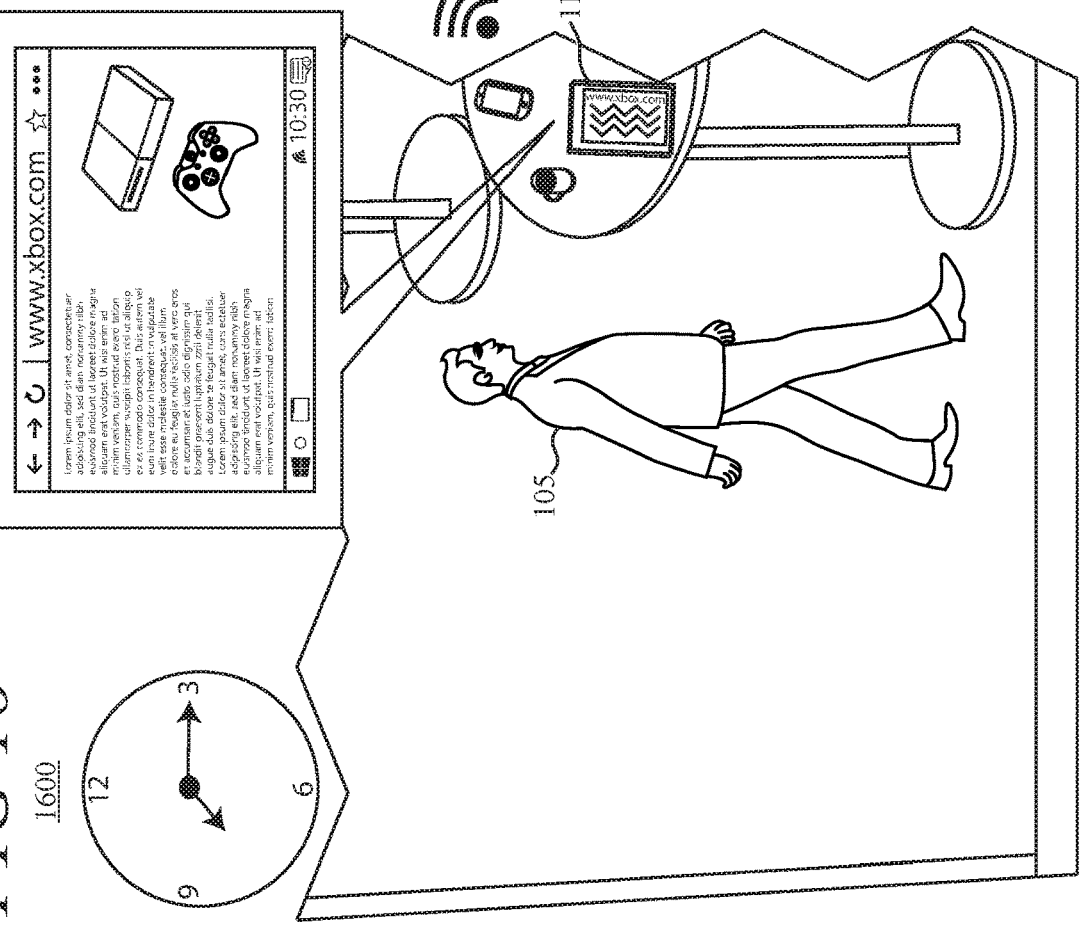

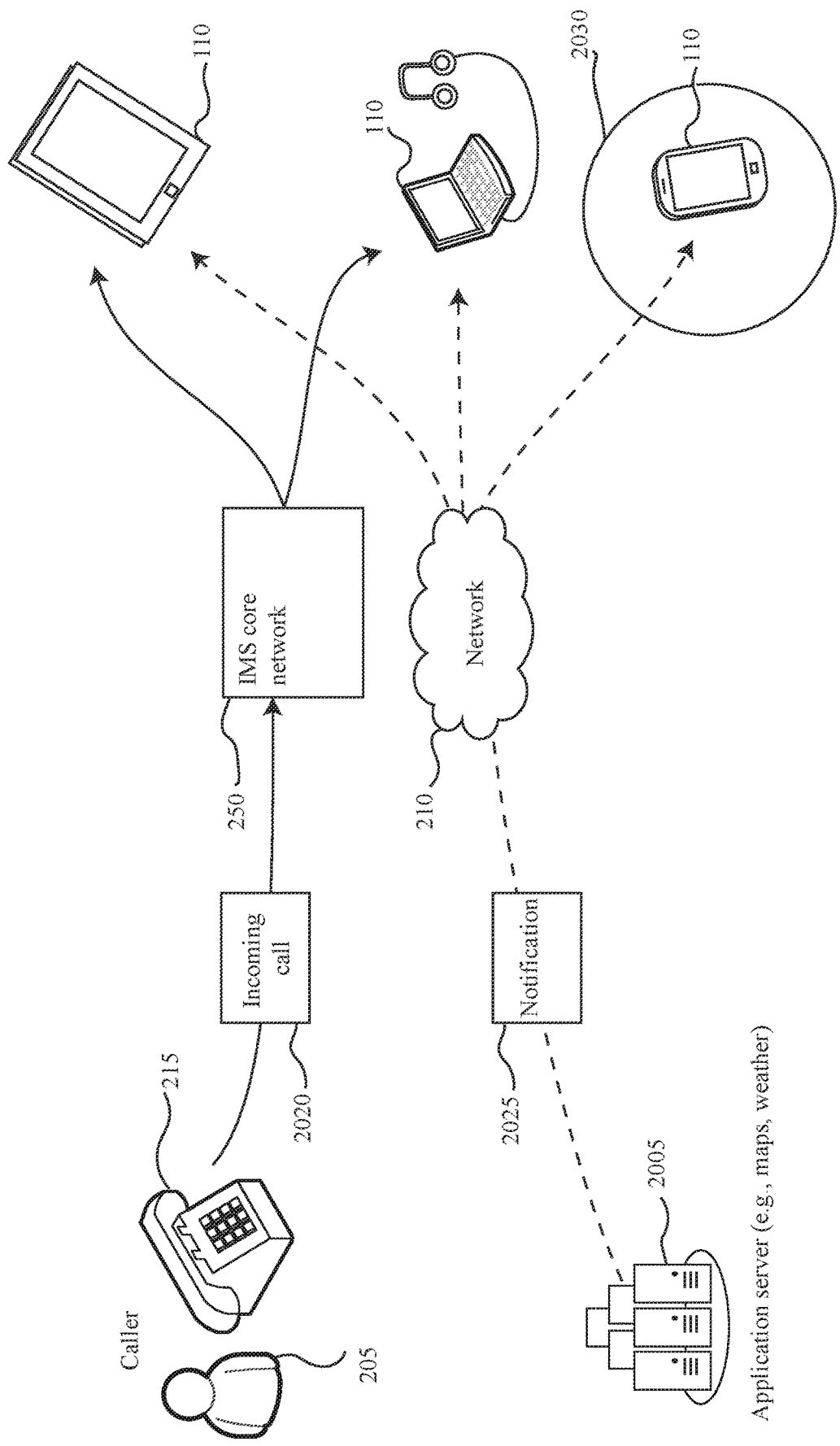

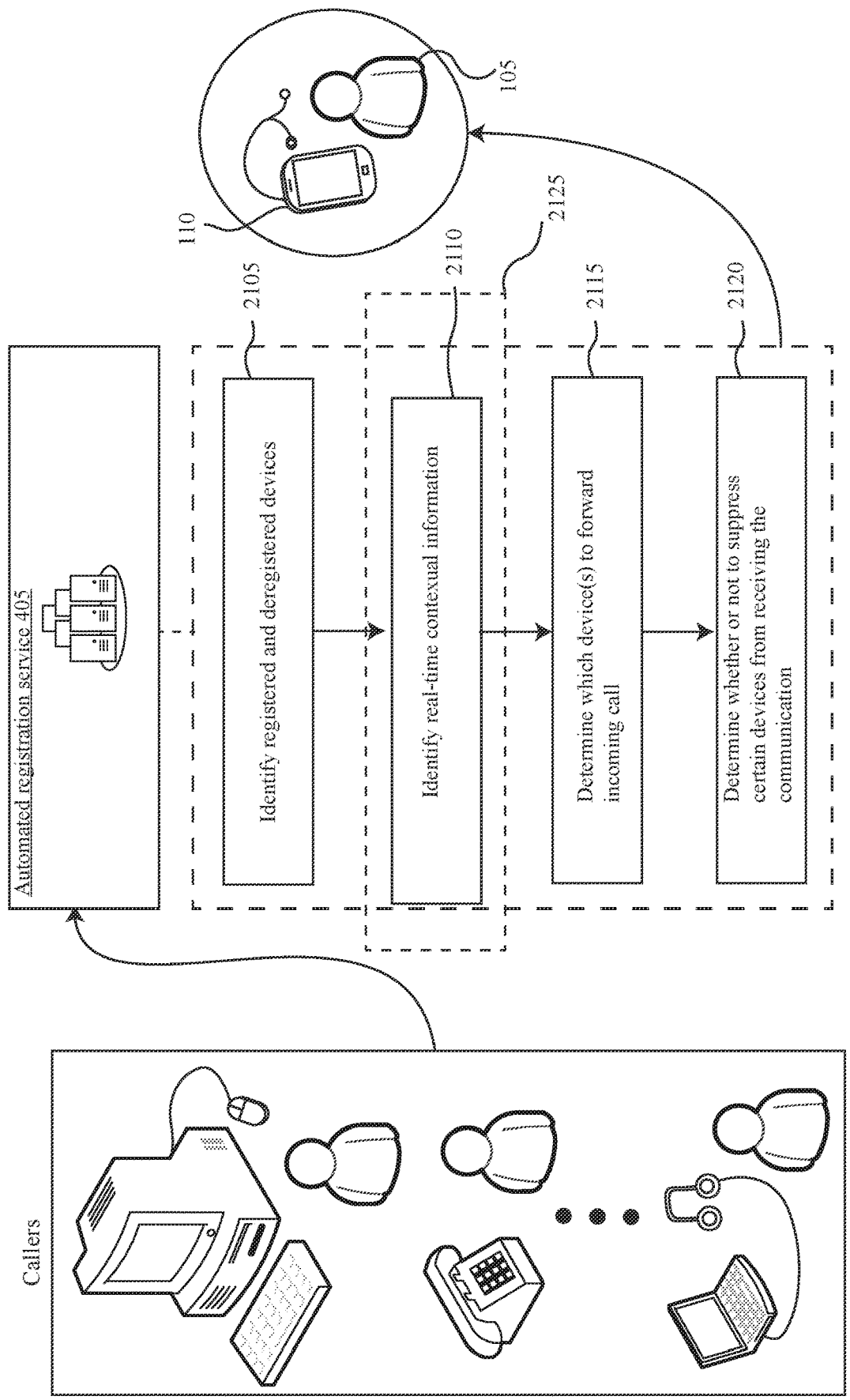

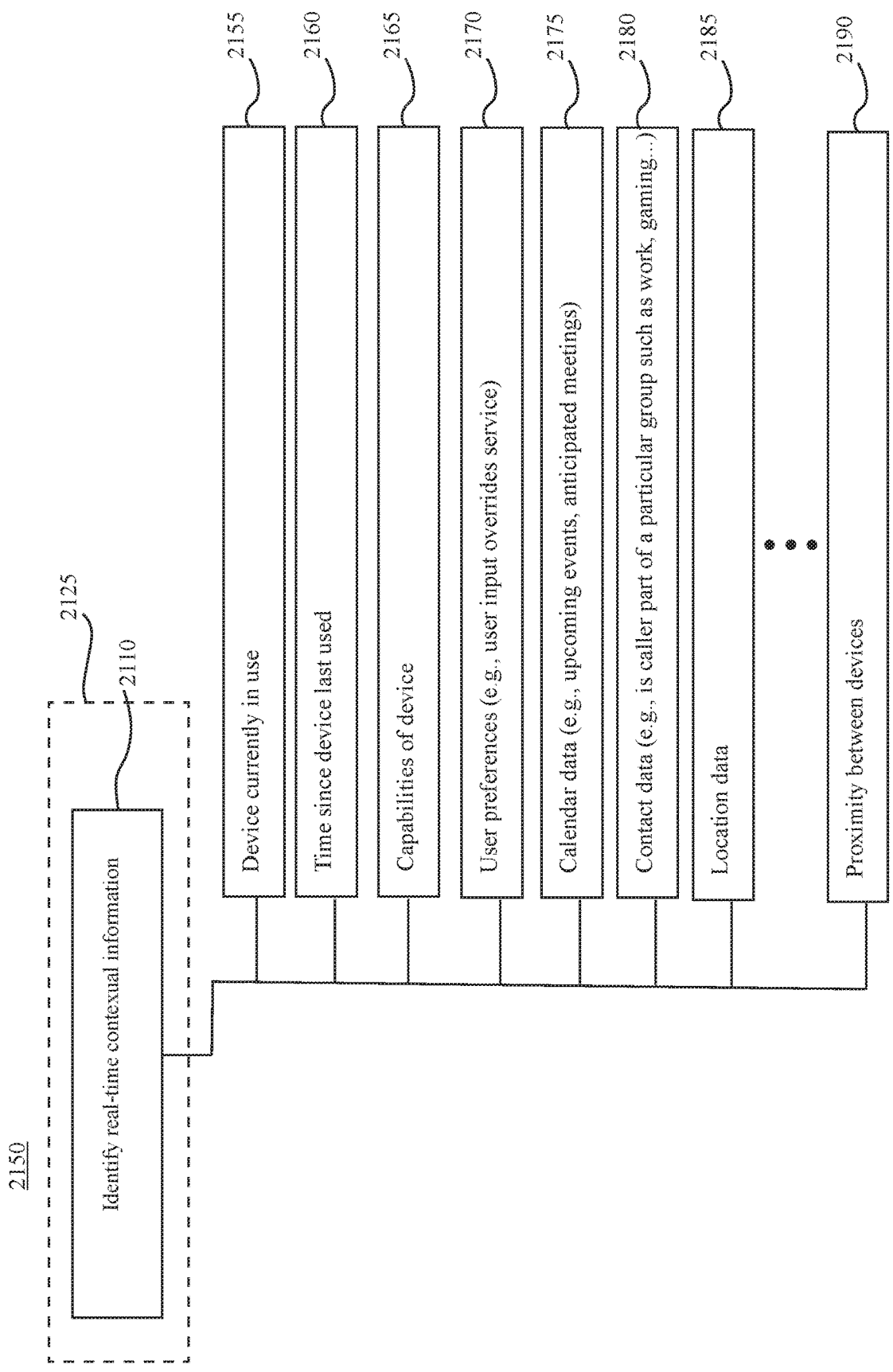

FIG 23
2300

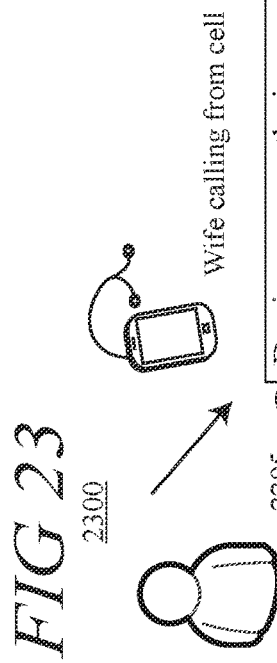

Wife calling from cell

| | |
|---|---|
| 2205 Devices currently in use | Automobile device |
| 2210 Time since device(s) last used | Automobile device – Currently in use<br>Smartphone – 3 minutes since last used |
| 2215 Capabilities of device | Automobile device – Microphone, speaker, and display<br>Smartphone – Microphone, speaker, front and back facing cameras, display |
| 2220 User preferences | When in automobile, do not ring smartphone and direct calls to automobile device |
| 2225 Calendar data | No upcoming events; work starts at 9:00 a.m. |
| 2230 Contact data | Wife is calling |
| 2235 Location data | Smartphone – Indicates user is currently in motion and in automobile<br>Wearable device – Indicates user is currently in motion and in automobile;<br>Automobile – Indicates user is currently in automobile |

Automated registration service 405

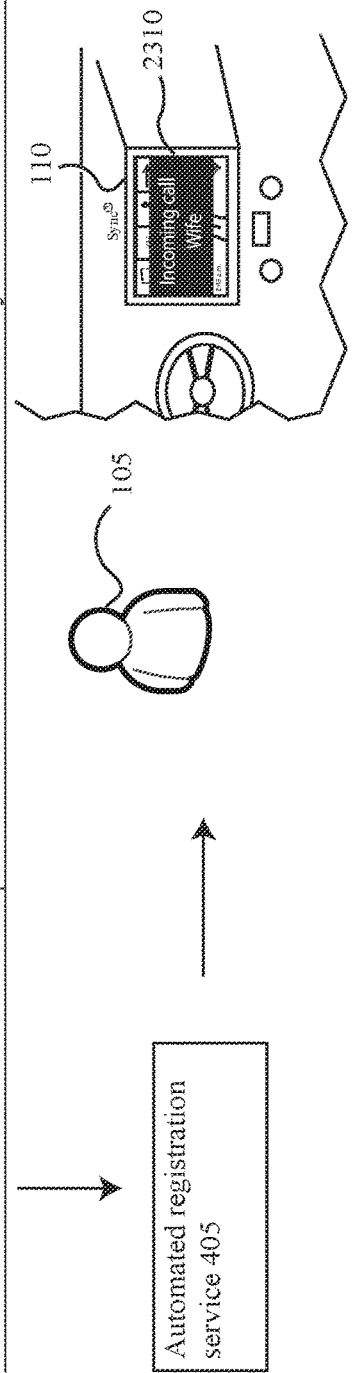

Co-worker calling from work PC

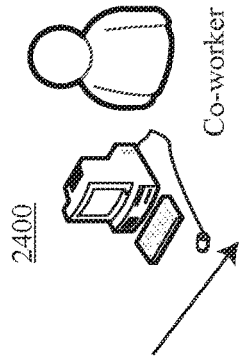

| | |
|---|---|
| 2205 Devices currently in use | Work PC |
| 2210 Time since device(s) last used | Work PC – Currently in use; Smartphone – 2 minutes; Automobile – 10 minutes, automobile device is off |
| 2215 Capabilities of device | Work PC – Microphone, speaker, and display Smartphone – Microphone, speaker, front and back facing cameras, display Automobile device – Microphone, speaker, and display |
| 2220 User preferences | None |
| 2225 Calendar data | Meeting in boardroom in 5 minutes |
| 2230 Contact data | Co-worker calling |
| 2235 Location data | Smartphone – Indicates user is currently in at work; Wearable device – Indicates user is currently at work; Automobile – Last known coordinates is at work |

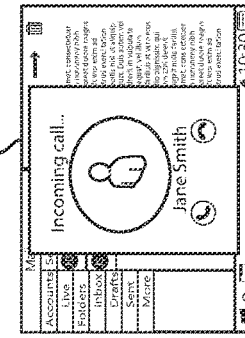
2415

Automated registration service 405

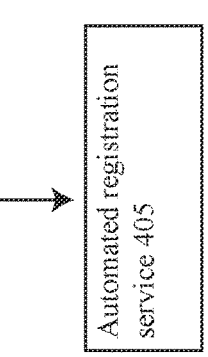
User devices 110

Co-worker calling from work PC

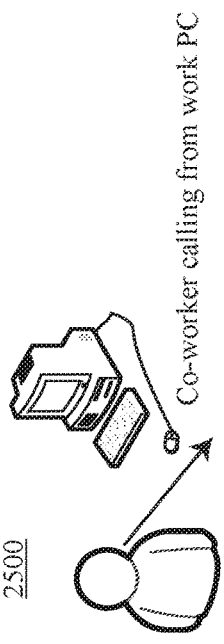

| | |
|---|---|
| 2205 Devices currently in use | Wearable band |
| 2210 Time since device(s) last used | Wearable band – Currently in use; Smartphone – 10 minutes; Work PC – 25 minutes ago; |
| 2215 Capabilities of device | Wearable band – microphone, speaker, display; Work PC – Microphone, speaker, and display; Smartphone – Microphone, speaker, front and back facing cameras, display; |
| 2220 User preferences | None |
| 2225 Calendar data | Meeting with co-worker in 1 hour |
| 2230 Contact data | Co-worker calling |
| 2235 Location data | Smartphone – Indicates user is currently in at work; Wearable device – Indicates user is currently at work; Automobile – Last known coordinates is at work |

Automated registration service 405

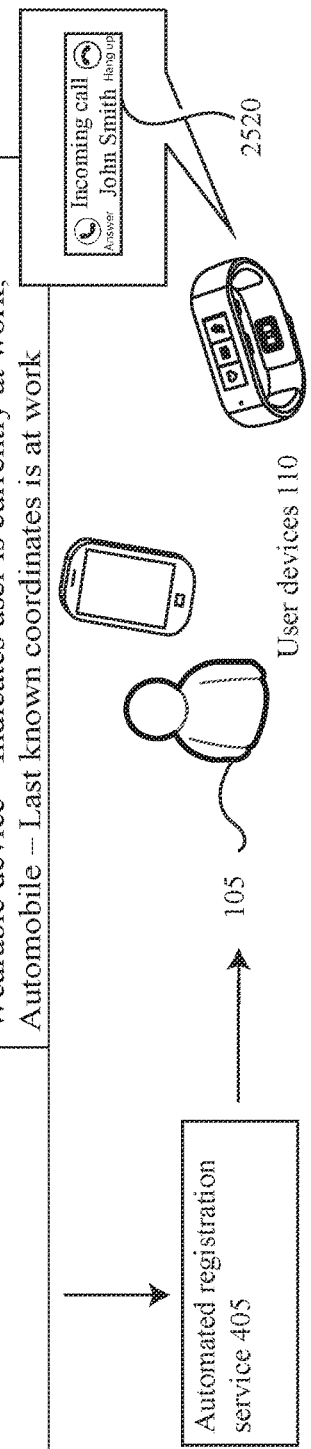

105

User devices 110

2520 Incoming call John Smith

Friend is video calling from game console and television

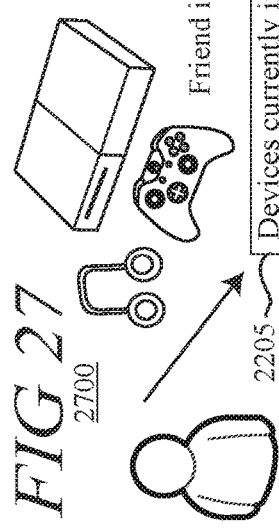
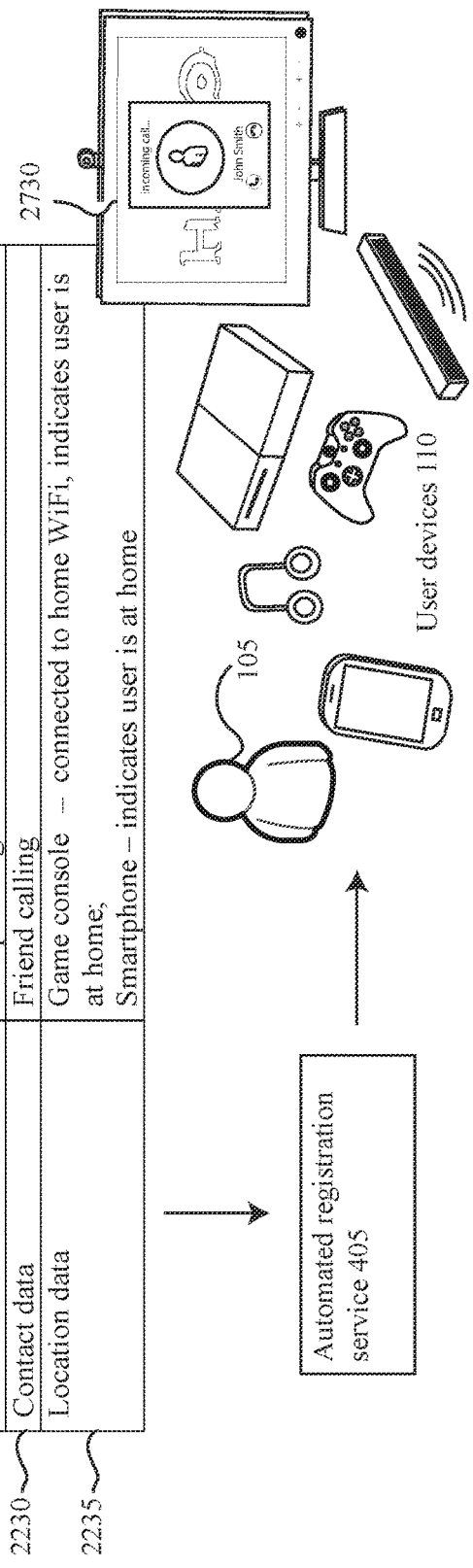

| | |
|---|---|
| 2205 — Devices currently in use | Game console, television |
| 2210 — Time since device(s) last used | Game console – Currently in use<br>Television – Currently in use<br>Smartphone – 1 minute ago; |
| 2215 — Capabilities of device | Game console connected to television<br>    Game console - Headset with microphone and speaker capabilities connected;<br>    Television – Speaker, webcam, display device<br>    Smartphone – Microphone, speaker, front and back facing cameras, display screen;<br>    Home phone – speaker and microphone; |
| 2220 — User preferences | None |
| 2225 — Calendar data | No upcoming events |
| 2230 — Contact data | Friend calling |
| 2235 — Location data | Game console – connected to home WiFi, indicates user is at home;<br>Smartphone – indicates user is at home |

Automated registration service 405

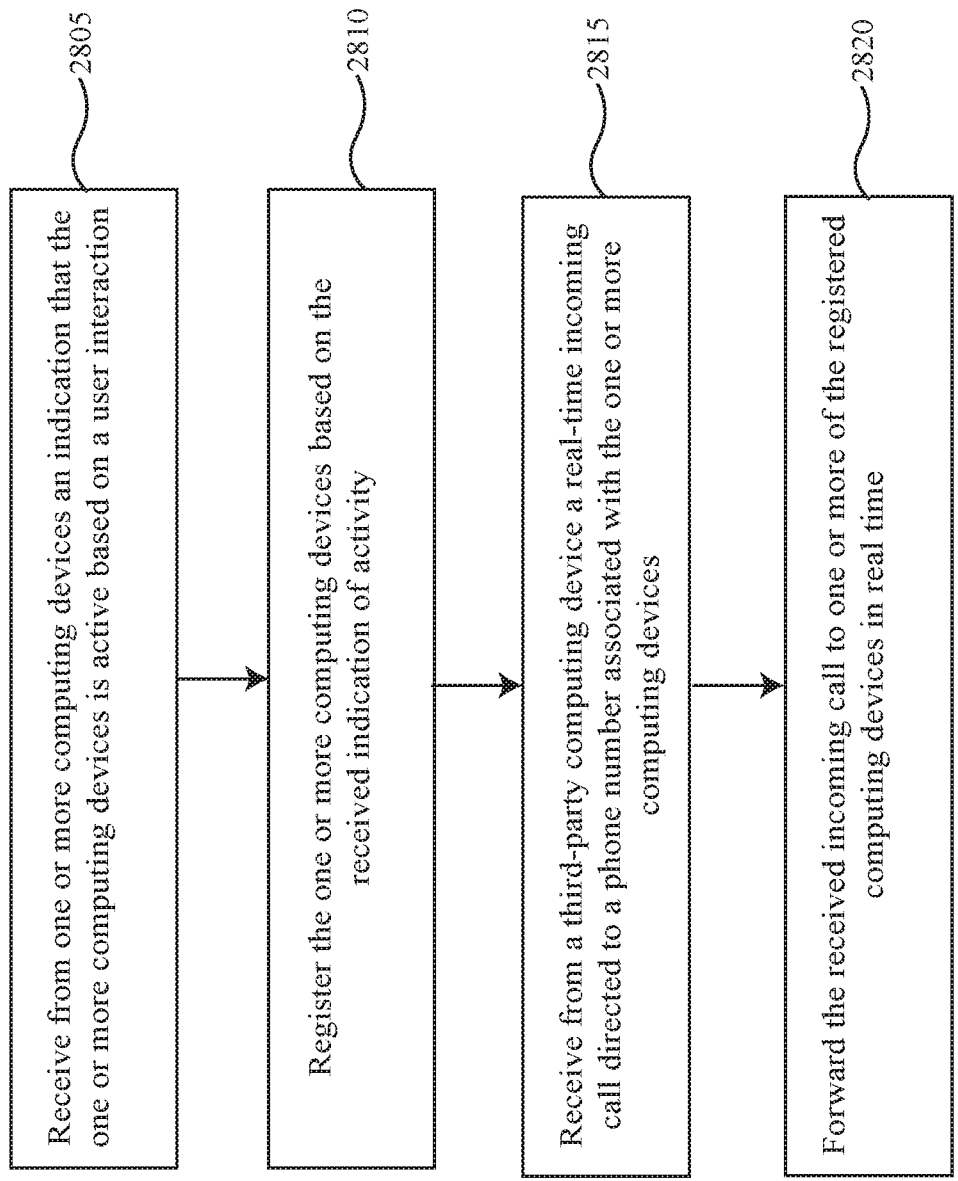

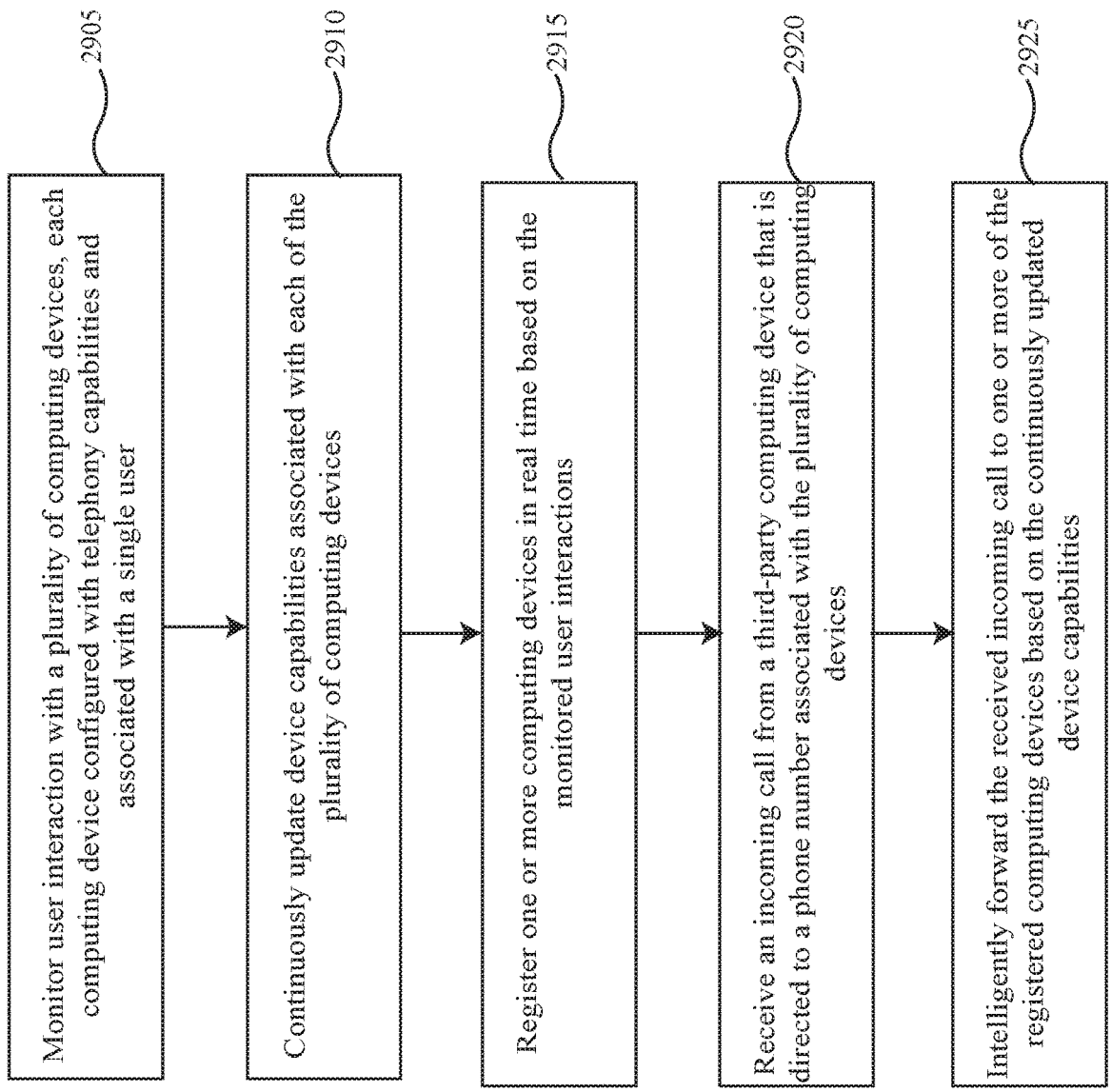

3000

3200

AUTOMATIC FORWARDING OF INCOMING CALLS BASED ON USER INTERACTION WITH DEVICES

RELATED APPLICATION

This application is a continuation of and claims benefit from U.S. application Ser. No. 15/591,919 filed May 10, 2017, entitled, "AUTOMATIC FORWARDING OF INCOMING CALLS BASED ON USER INTERACTION WITH DEVICES" which is incorporated herein by reference in its entirety.

BACKGROUND

Users can make and receive telephone calls on a wide variety of computing devices including mobile phones, tablet computers, wearable computers, and personal computers when such devices are registered to operate on cellular, IP-based (Internet Protocol), circuit switched, etc. networks.

SUMMARY

An automated registration service supported on an application server that interoperates with an IMS (Internet Protocol Multimedia Subsystem) core network is configured to dynamically register and deregister various ones of the user's computing devices to make and receive phone calls by assigning a single, commonly-utilized or commonly-shared phone number. The automated registration service intelligently forwards an incoming call to the phone number of one or more devices based on registration status and other contextual information. The automated registration service can monitor, with notice to the user and user consent, activities on the user's various devices that indicate, for example, if a device is currently in use, whether the user has recently logged in, the elapsed time since the device was last used, etc., and then register or deregister a device in response to the monitored information. In addition to call forwarding based on the registration or deregistration status of the given device, the automated registration service can also utilize known or intelligently inferred contextual information to further refine the user's devices to which a given incoming call is forwarded.

In various illustrative examples, the automated registration service retrieves device capabilities for each device that is associated with the user. The device capabilities can include, for example, whether a device is equipped with a microphone, speaker, display, and camera, and may also include device state information such as current battery level, network connectivity strength, performance level of a device (e.g., processor speed), and quality of device components (e.g., display resolution). The automated registration service may store these device capabilities in a database associated with the service. In addition, the automated registration service may receive and dynamically update the device capabilities and contextual information for a device.

For example, a user may have a game console that lacks a microphone or other device for a user to vocally communicate with a remote party, and the user may also have a smartphone. When a headset with microphone capabilities is connected to the game console, the game console may be configured to automatically provide an update to the automated registration service to indicate that the game console state presently includes a capability for the user to communicate by voice. In this scenario, when the IMS core network handles an incoming call, the automated registration service considers the game console as a viable device to which the incoming call may be directed. Without the microphone being coupled to the game console, the automated registration service would have determined that the user's smartphone was the only viable device for the incoming call in this example.

The automated registration service may automatically register and deregister devices over a given time period (e.g., throughout the day). For example, when a user inputs a password or otherwise is authenticated to use his smartphone, the smartphone may provide an indication of the user's action, such as a signal or message, to the automated registration service. As a result, if the smartphone was not already registered, the automated registration service may register the smartphone, and if the smartphone was already registered, the automated registration service may maintain the registration of the smartphone. As the user employs and operates other devices throughout the day, the automated registration service may accordingly deregister the smartphone and register the device that has been identified as in use.

When one or more devices is registered with the service, then the service may assign the commonly-utilized phone number to the registered device. In contrast, when the one or more devices is deregistered with the service, then the service may un-assign the commonly-utilized phone number to the deregistered device. The service may forward or otherwise direct an incoming call to the assigned (i.e., registered) devices, and the service may suppress the incoming call to the un-assigned (i.e., deregistered) devices.

For example, when the user enters an automobile, the automated registration service may deregister the user's smartphone and register the automobile's one or more integrated communication devices. In this scenario, when the IMS core network receives an incoming call, the automated registration service may forward the call directly to such automobile device and not the smartphone. The automated registration service could also direct the incoming call to both the automobile device and the smartphone, or alternatively direct the call to only the automobile device while suppressing delivery of the incoming call to the user's smartphone.

In addition to the automated registration service providing incoming calls to devices based on the respective device's registration or deregistration status, the service may further consider real-time contextual information including device capabilities. For example, if the IMS core network receives an incoming video call, but the user is currently using a tablet computer without a front-facing camera, then the automated registration service can responsively direct the call to the user's smartphone (which does include a front-facing camera in this example), in addition to or as an alternative to the tablet computer. Alternatively, if the user's tablet computer does employ a front-facing camera and the tablet computer is currently in use, then the service may direct the incoming phone call to the tablet computer and not to the smartphone. The automated registration service may also take into consideration other contextual information, such as the amount of time since a device was last used, user preferences, calendar data (e.g., upcoming events), contact data (e.g., the identity of the caller), and location data of the user.

The present automatic forwarding of incoming calls provides for various advantages for the network, the devices, and the overall user experience with the network and devices. For example, a determination that only a particular device should receive an incoming call saves network bandwidth since the other devices purposely and intelligently do not receive the call. In addition, device resources (e.g., battery power) are saved when the other devices purposely and intelligently do not receive the call. Furthermore, the user experience is improved because, for example, the user may answer an incoming video call on devices that are equipped with video call capabilities (e.g., a webcam or front-facing camera). Additionally, the user will not regrettably answer the incoming video call on a device that is un-equipped with the video call capabilities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 5B shows an illustrative diagram of the flowchart of FIG. 5A;

FIG. 7A shows illustrative actions and events that trigger registration of the user device with the automated registration service;

FIG. 7B shows illustrative actions and events that trigger deregistration of the user device with the automated registration service;

FIG. 8 shows an illustrative user interaction with his smartphone;

FIG. 9 shows the processes of the automated registration service performed in response to the user interaction of FIG. 8;

FIG. 10 shows an illustrative user interaction with his automobile device;

FIG. 11 shows the processes of the automated registration service performed in response to the user interaction of FIG. 10;

FIG. 14 shows illustrative user interaction with his wearable band;

FIG. 15 shows the processes of the automated registration service performed in response to the user interaction of FIG. 14;

FIG. 16 shows an illustrative user interaction with his tablet;

FIG. 17 shows the processes of the automated registration service performed in response to the user interaction of FIG. 16;

FIG. 20 shows an illustrative incoming call and notification transmitted to multiple user devices;

FIG. 21A shows an illustrative method performed by the automated registration service to determine which devices to forward an incoming call to and which device(s) to prevent from receiving the incoming call;

FIG. 21B shows illustrative contextual information considered by the automated registration service when determining which devices to forward the incoming call to and which devices to prevent from receiving the incoming call;

FIGS. 22-27 provide various exemplary use scenarios with differing contextual information;

FIGS. 28 and 29 show illustrative methods performed by the automated registration service;

Like reference numerals indicate like elements in the drawings. Elements are not drawn to scale unless otherwise indicated.

DETAILED DESCRIPTION

Figure 1:
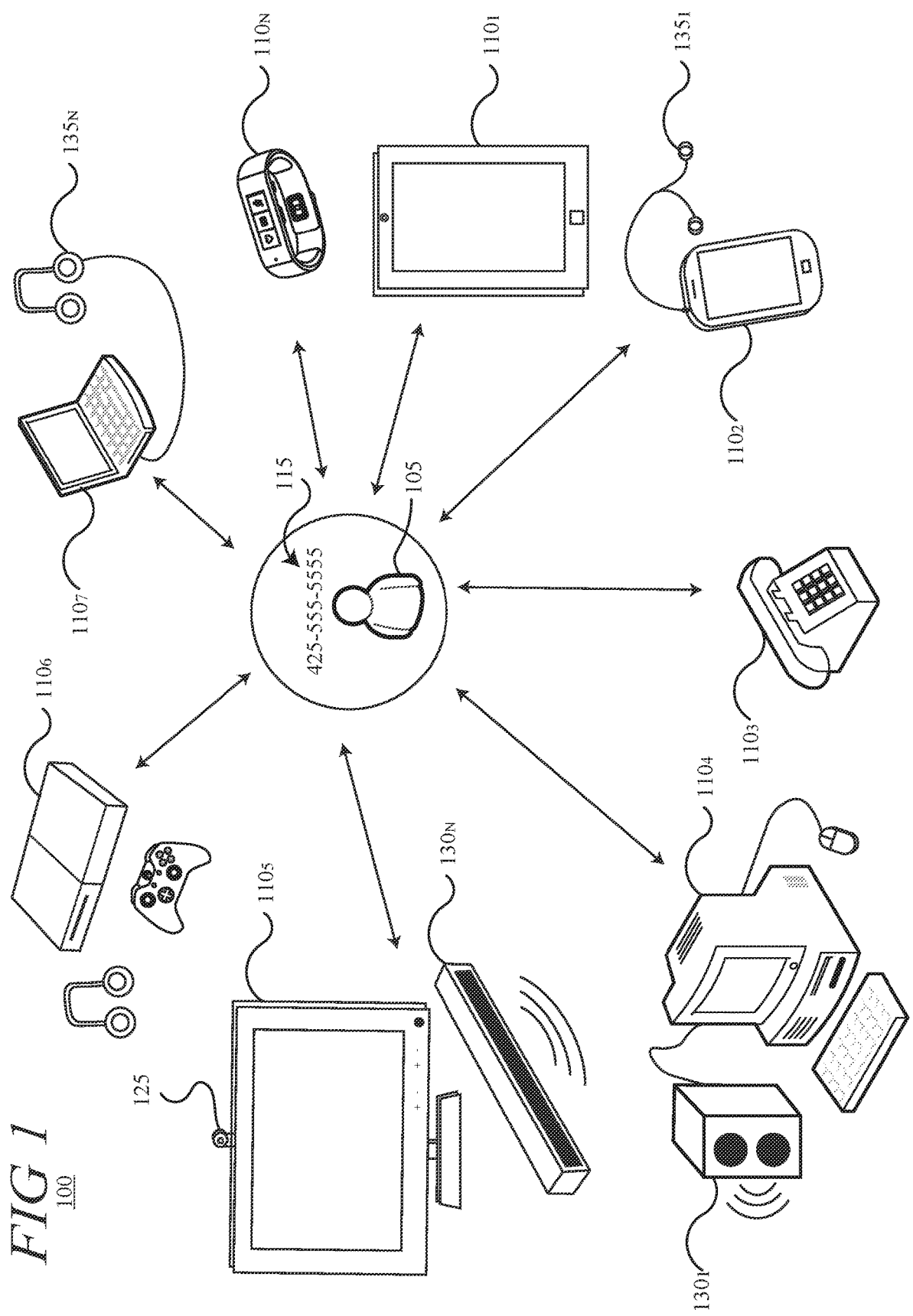
FIG. 1 shows an illustrative environment in which a single user and a single phone number can be associated with a plurality of devices.

FIG. 1 shows an illustrative environment 100 in which a single user 105 and a single phone number 115 associated with user 105 can be associated with a plurality of devices 110. In this regard, each of the devices 110 may be associated with a commonly-utilized or commonly-shared phone number 115. As depicted in FIG. 1, these devices 110 can include a game console, laptop computer, personal computer (PC), tablet, smartphone, television (e.g., smart television), wearable device, and home telephone. These devices 110 can support telephony capabilities (e.g., voice and/or video, text, or chat) and typically support data-consuming applications such as Internet browsing and multimedia (e.g., music, video, etc.) consumption in addition to various other features. These devices 110 may be used by users to make and receive voice and/or video calls (individually and collectively referred to as "calls"), share multimedia, engage in messaging (e.g., texting) and email communications, use applications, and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, multimedia consoles, or the like. In the discussion that follows, the use of the term "device" is intended to cover all devices that are configured with telephony communications capabilities and/or are otherwise enabled for IMS (Internet Protocol Multimedia Subsystem) services, as discussed in more detail below, and are capable of connectivity to one or more of the networks.

Accessory devices, such as wristbands and other wearable computing devices may also be present in the environment 100. Such accessory devices are typically adapted to, but not limited to, interoperate with a coupled device 110 using a short-range communication protocol like Bluetooth® to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110 or the network directly. Some accessory devices can be configured to work on a standalone basis (i.e., without relying on a coupled device 110 for functionality such as Internet connectivity) as wearable computing devices that may support an operating system and applications. Accessory devices may further include other electronic devices which provide additional features and functionality to the subject devices 110, such as webcam 125, speakers 130, and headphones 135.

Figure 2:
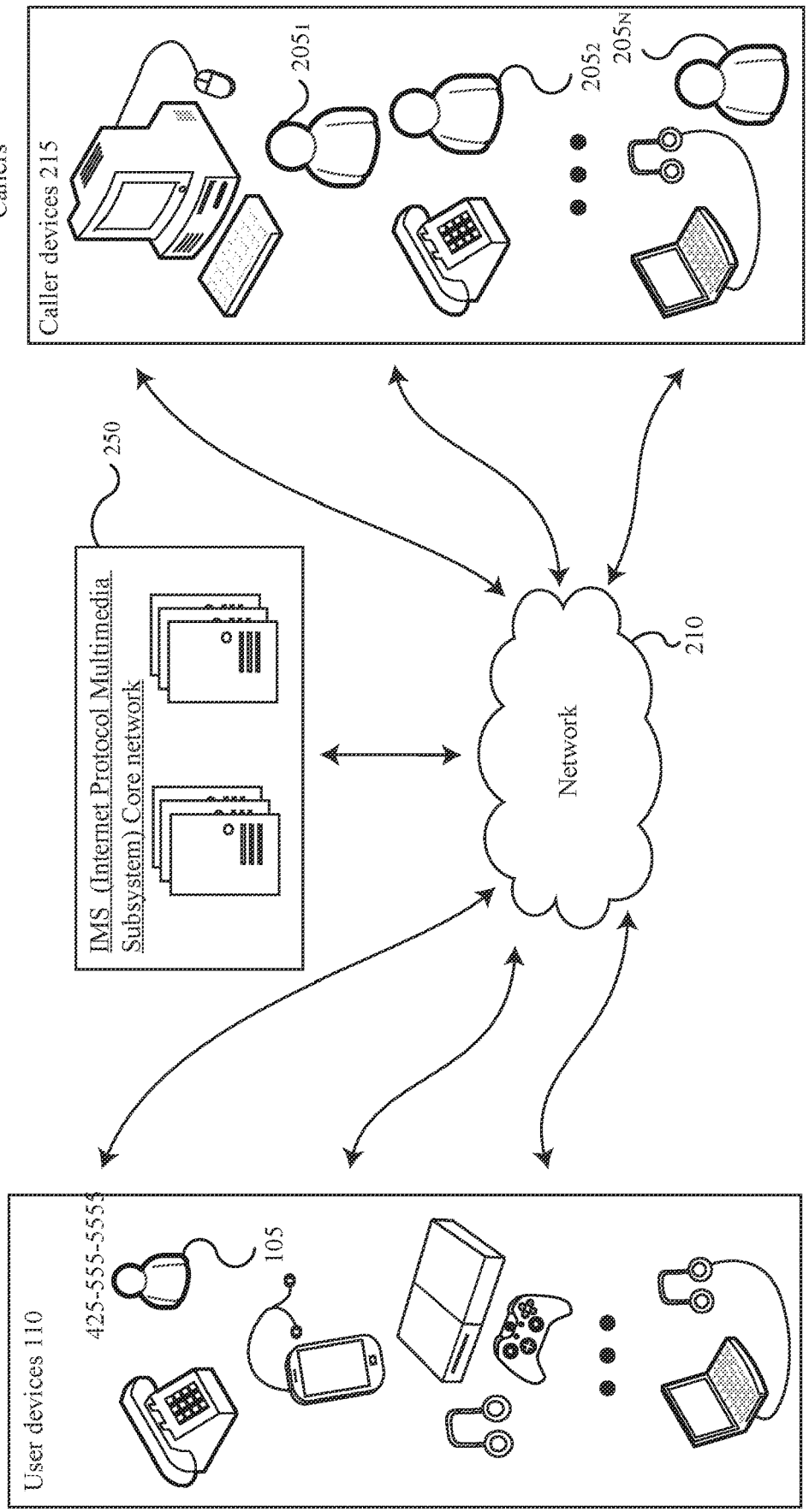
FIG. 2 shows an illustrative architecture of a user communicating with one or more callers over an Internet Protocol Multimedia Subsystem (IMS) core network.

FIG. 2 shows an illustrative communication architecture 200 between devices 110 and caller devices 215 over network 210 and IMS core network 250. As depicted in FIG. 2, each user (e.g., as indicated by reference numerals 105 and 205) and his respective device connects with the IMS core network 250 over network 210, and the IMS core network 250 registers each device and establishes a connection between the two or more devices.

Figure 3:
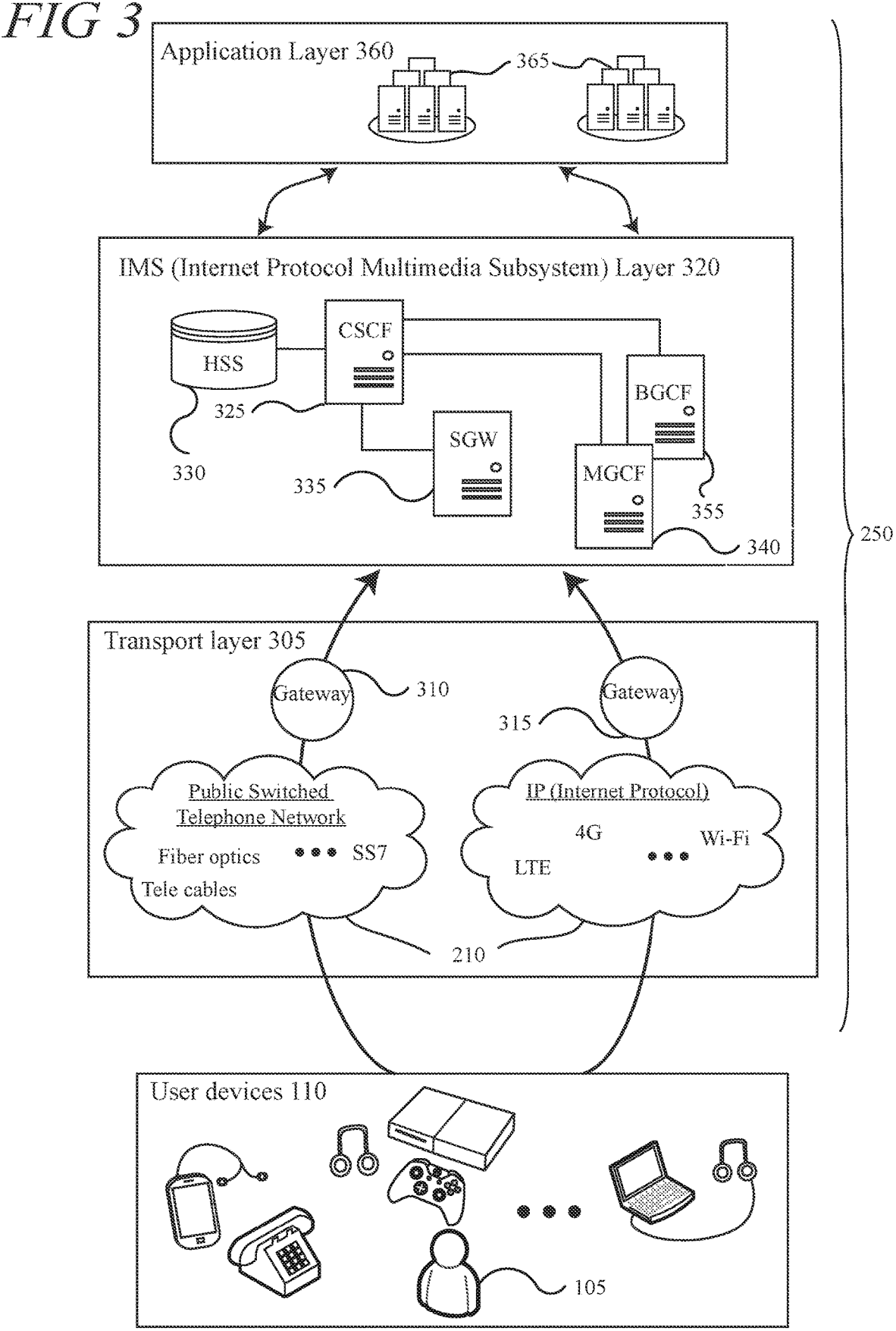
FIG. 3 shows the IMS core network of FIG. 2 in greater detail.

FIG. 3 shows the illustrative IMS core network 250 of FIG. 2 in greater detail, which is provided in simplified form to highlight the functionality of certain elements. For example, the IMS core network 250 provides a system architecture to support and provide the interoperability for various types of connections and devices when users establish a communication, such as a telephone call or video call, over network 210. For example, as depicted in FIG. 3, IMS core network architecture 250 includes at least three layers, a transport layer 305, IMS Layer 320, and application layer 360. The IMS core network 250 may include any number of environments in which communications are rooted, such as PSTN (Public Switched Telephone Network) and IP (Internet Protocol) topographies. More specifically, and by way of example only, the various devices 110 may establish communications from the transport layer 305 via PSTN (e.g., using fiber optics, telephone cables, and suitable signaling protocols such as Signaling System No. 7 (SS7)), and additionally the various devices 110 may establish communications from the transport layer 305 via an IP network (e.g., LTE, 4G, and Wi-Fi).

These various types of communications may interact with the IMS Layer 320, which provides support for the interoperability of each topography of communication that is initiated or utilized by the respective devices 110. The IMS layer is responsible for regulating communication flows (in this description, the term IMS core network refers to infrastructure supporting IMS functionality in general). The main functional elements of the IMS layer 320 include a Call Session Control Function (CSCF) 325 that is configured for controlling sessions between devices and applications. A Home Subscriber Server (HSS) 330 is a database maintaining user profile information which is used to authenticate and authorize network subscribers. A Signaling Gateway (SGW) 335 and a Media Gateway Control Function (MGCF) 340 provide interoperability with a Circuit Switched network using a gateway 310 to the transport layer 305. A Breakout Gateway Control Function (BGCF) 355 may be implemented to select which network a breakout of a PSTN connection can occur, and establish the connection with the MGCF 340. The transport layer 305 further supports the IP network and respective gateway 315.

The transport layer 305 is the network-access layer that enables devices 110 to connect to the IMS core network 250 and establish IP connectivity. Once a device 110 has an IP address and can exchange SIP (Session Initiation Protocol) messages, it becomes capable of interacting with an IMS core network 250, independent of the underlying network-access technology.

The application layer 360 supports various application servers 365. While application servers 365 can be included as part of infrastructure in the IMS core network 250, application servers may additionally or alternatively be separate and thereby remote therefrom. Application servers 365 are typically configured as an IMS network element to provide services to an end user (e.g. users 105 and 205 in FIG. 2) and thus may provide the business logic in an IMS core network 250. Such services may include, for example, conference bridging, text to speech, billing, interactive voice response, and the like. The application servers 365 communicate with the IMS core network using SIP.

The CSCF 325 can play three discrete roles: Serving-CSCF (S-CSCF), Interrogating-CSCF (I-CSCF), or Proxy-CSCF (P-CSCF) which each use SIP signaling. An S-CSCF exposes a registrar that receives registration information from respective devices that are associated with a user when the devices register with the IMS core network for IMS services using suitable SIP messages. More than one of the user's devices can be registered at the same time, and devices can maintain registration with the network or discontinue registration at any time. For example, the user may associate a common phone number with one or more of his devices so that an incoming call from the calling party (FIG. 2) can ring on each one of the devices that is currently registered with the IMS core network.

Figure 4:
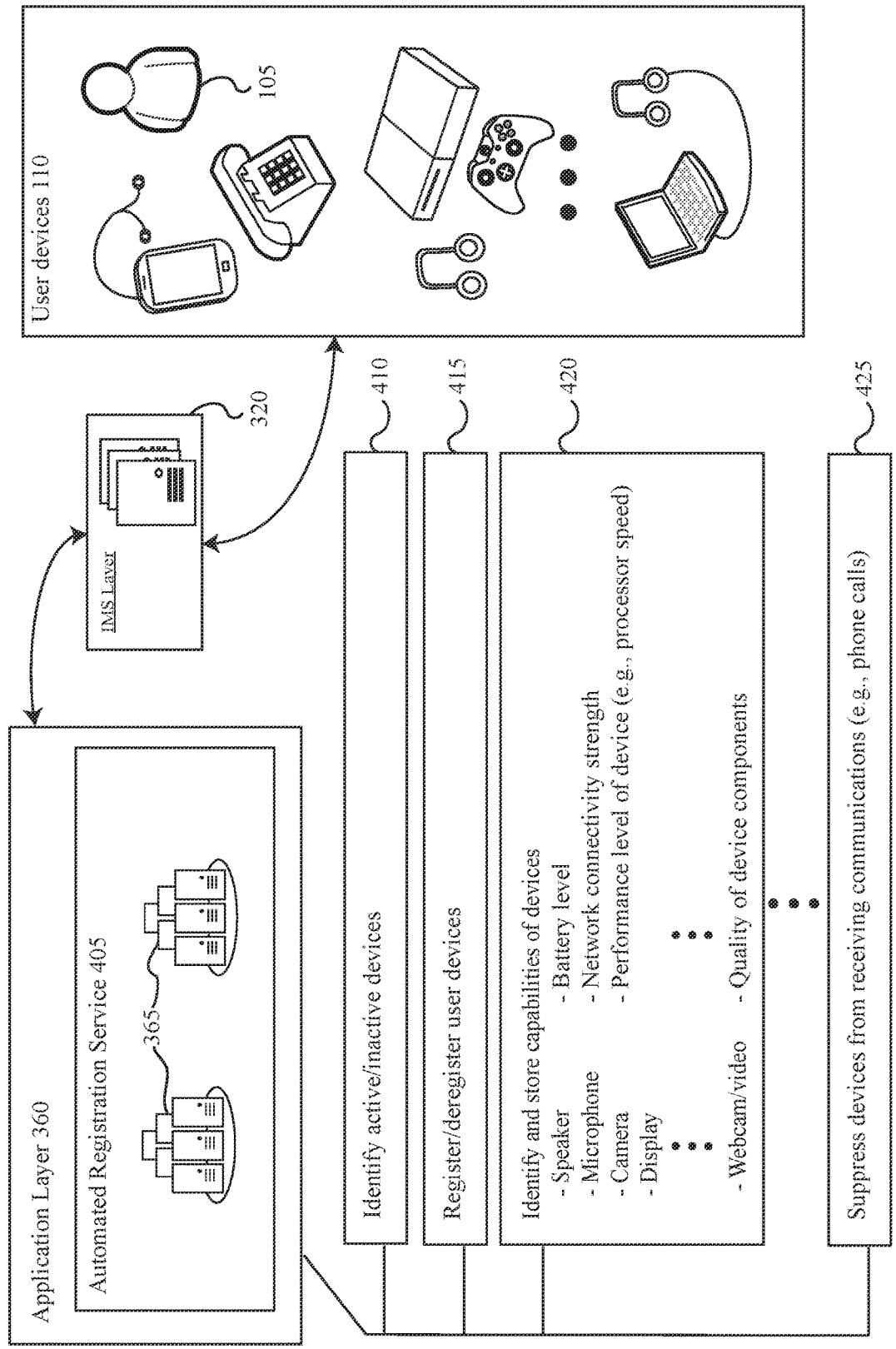
FIG. 4 illustrates exemplary tasks implemented by an automated registration service supported by an application layer of the IMS core network.

FIG. 4 illustrates devices 110 interacting with an automated registration service 405 which is associated with application servers 365 of the application layer 360. When the automated registration service 405 has the various permissions from user 105, the automated registration service 405 is capable of several tasks as further described below. Generally, the tasks include identifying active and inactive devices 410; registering and deregistering devices 415; identifying, storing, and updating device capabilities (e.g., speaker, microphone, camera, display, webcam/video, battery level, network connectivity strength, performance level of device, and quality of device components such as the number of megapixels supported in a webcam) 420; and suppressing certain devices from receiving communications (e.g., calls, notifications, messages) 425. When a device is suppressed, the service may not direct or forward the call to that device. For example, the service may block or otherwise prevent the capability of the incoming call from forwarding to that device. Alternatively, the device may transmit a signal or communication to the device to reject, ignore, etc. the incoming call. As another example, the device may temporarily disable its telephonycapabilities to reject the call. The registration and deregistration of devices with the automated registration service 405 may be separate from the registration of the devices with the IMS core network 250 as discussed above, thereby providing proprietary control over the processes performed by the automated registration service 405.

Figure 5A:
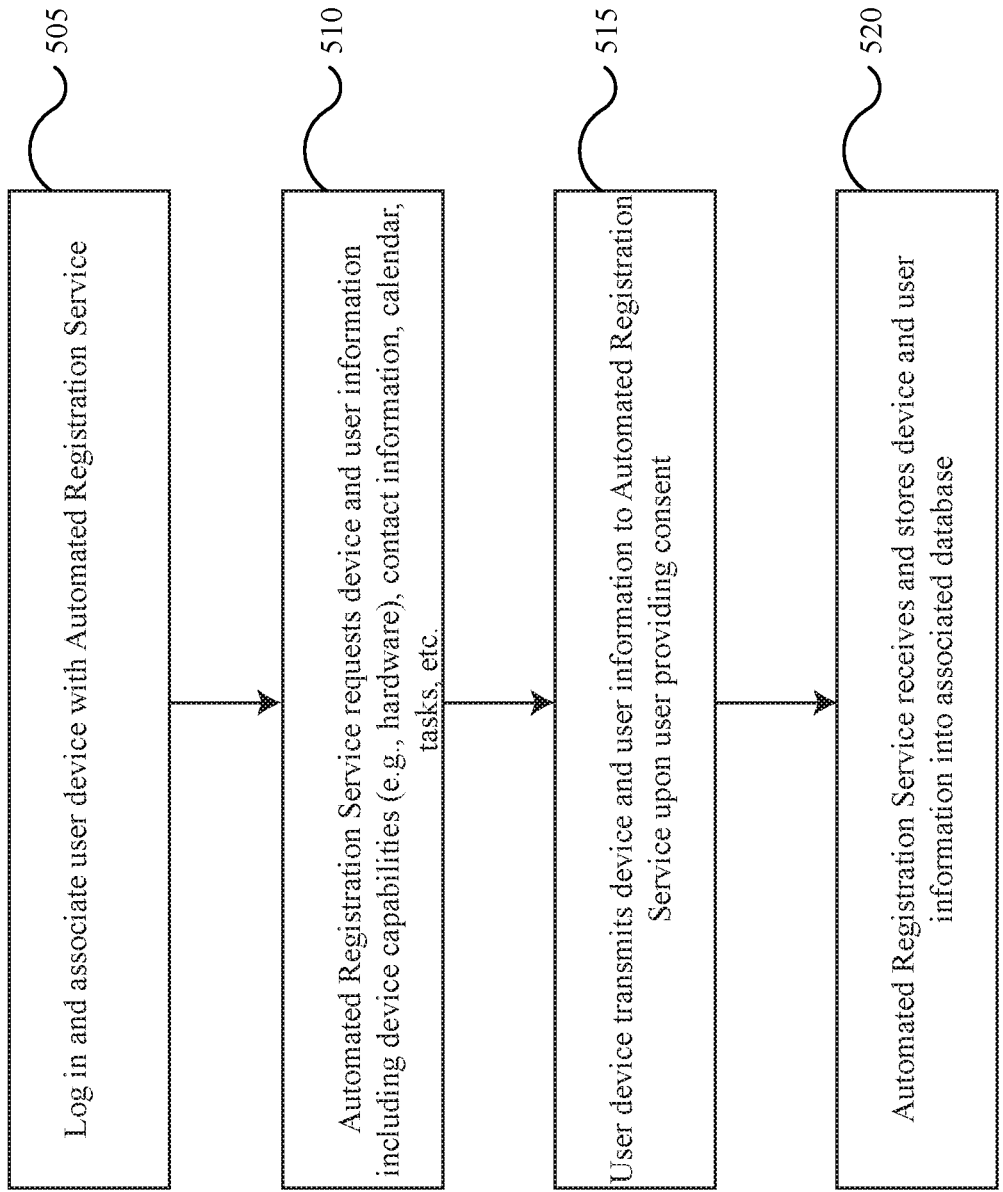
FIG. 5A shows an illustrative flowchart of a user device interacting with the automated registration service.

FIGS. 5A and 5B provide an exemplary method in a flowchart 500 and diagram 550 of a user's interaction with the automated registration service 405. For example, at step 505 the user logs into his device and accesses the automated registration service 405. This may occur prior to or contemporaneously with any call or other communication session initiated through the IMS core network. At step 510, the automated registration service requests device and user information from the user's device 110. The user may provide complete authorization to the automated registration service to access such information across all of the user's devices, or just particular ones of the devices.

The user information may include device capabilities (e.g., hardware and/or associated service capabilities), contact information, calendar information, tasks, etc. Upon providing permission for the automated registration service 405 to receive such information, at step 515 the device 110 may automatically transmit such device and user information to one or more application servers associated with the automated registration server 405 (FIG. 4). At step 520, the automated registration service receives and stores the device and user information. In addition, the various devices may continuously and/or periodically update the automated registration service with the information. For example, if the user adds another contact to the contact data, then that contact may likewise be provided as an update to the automated registration service. The other device and user information may be similarly updated with the automated registration service.

Figure 6:
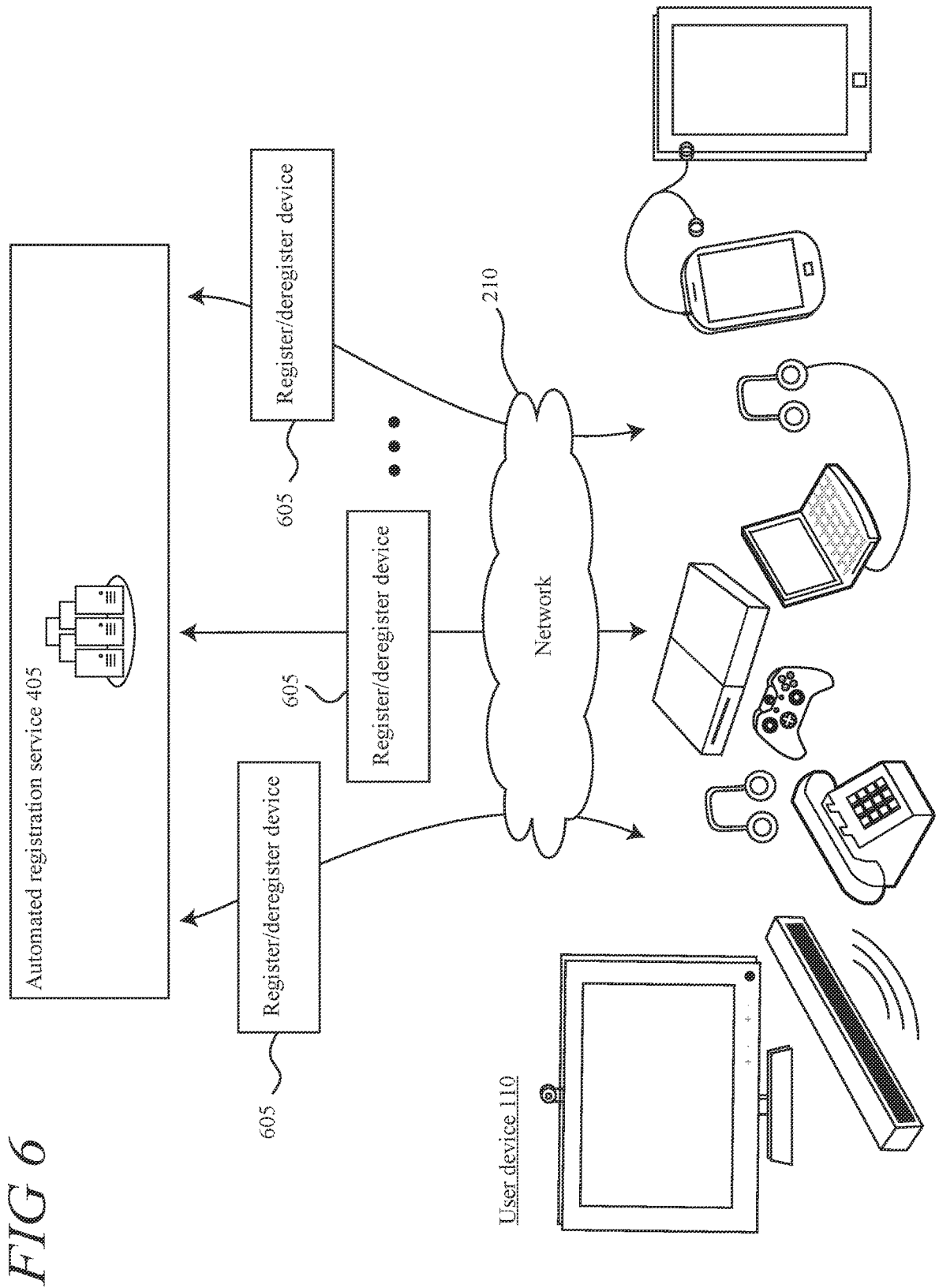
FIG. 6 shows an illustrative registration and deregistration of user devices with the automated registration service over a network.

As shown in FIG. 6, when the one or more devices 110 are associated with the automated registration service 405, the service may dynamically and automatically register and deregister 605 each of the devices. When a device is registered with the service, the service may assign the commonly-utilized phone number that is associated with the user to the active device. In contrast, when a device is deregistered with the service, the service may un-assign the phone number that is associated with the user to the inactive device. Because the inactive device is no longer assigned with that phone number, incoming calls may not be forwarded to the device until that device becomes registered. The registration and deregistration of devices is discussed further below.

As shown in FIG. 7A, the device 110 may include a plugin or registration/deregistration application 705 that is configured to automatically cause the device to transmit the associated data using, for example, a signal or other suitable communication, to the automated registration service 405. The signal may indicate that the device is presently in an active or inactive state, or the signal may also or alternatively provide information regarding the activity performed on the device.

As shown in FIG. 7A, various user interactions 700 with device 110 can be utilized to trigger an active state, and thereby register the device 110 with the automated registration service 405. For example, user interactions such as checking e-mail 725, communicating with others (e.g., using messaging, calling) 730 can cause the device to be registered as being active with the automated registration service. Even further, other user actions, such as switching a device on 710; bypassing a lock screen (e.g., entering correct password) 715; browsing folders, files, or screens 720; and opening an application 735 (e.g., web browser, game, maps) such as by selecting a GUI (Graphical User Interface); can invoke registration with the automated registration service 405. Additionally, real-time contextual information 740, for example the location of a user, that is applicable to a given situation can also be utilized to trigger an active state of the device and thereby register the device with the service.

The real-time contextual information can be information that relates to a device implicitly or explicitly. This real-time information can be data that is in actual time or virtually actual time as the data becomes available. For example, the real-time location of the user can be utilized by the service to accurately and properly determine an action. The contextual information can include data or other information that identifies aspects of the user, or as another example the device's and/or the user's environment. For example, a geographical location of the user, the user's location based on landmarks or establishments, weather, and the status of the user (e.g., temperature, heart rate, exercising, idle, etc.).

In this regard, for some elements such as location data to be utilized, the registration/deregistration application 705 may interoperate with the automated registration service 405. For example, the automated registration service may receive and utilize location information from all capable devices when performing device registration and/or deregistration. For example, when the automated registration service receives location data indicating that the user's automobile and smartphone are at home, the service may also register the user's home phone. Therefore, the proximity of devices relative to each other may be used to select which devices to register and deregister.

FIG. 7B provides illustrative user interactions and real-time contextual information 750 that may be utilized to determine whether or not to deregister the device 110 with the automated registration service 405. Exemplary user interactions and real-time contextual information can include inactivity on the device for a predetermined threshold of time 755 (e.g., five minutes, 30 minutes), switching power off on the device 760, the user's failure to bypass the lock screen 765 (e.g., entering incorrect password), the device entering sleep mode or being placed in "do not disturb" mode 770, and real-time contextual information (e.g., location data) 775. In a similar manner as in the example provided above for registering the device 110, when the automated registration service receives location data indicating, for example, that the user's smartphone and/or automobile device are no longer located at home, the service may deregister the user's home phone device. In addition, when the location data indicates that two devices are beyond a threshold proximate distance to each other, then such indication can be used to trigger registration or deregistration of given devices. For example, if the smartphone is beyond a threshold proximate distance from the home phone, then that can trigger the deregistration of the home phone.

FIGS. 8-19 show various illustrative user interactions with different devices 110 throughout an exemplary day, and the subsequent actions performed by the automated registration service 405 because of the user interactions. In each of the examples, after the user 105 performs an action, the action may be transmitted to the automated registration service using the registration/deregistration application 705 as discussed above (FIGS. 7A-B). It may be understood that the various examples provided are illustrative only.

FIG. 8 shows an exemplary scenario 800 of user 105 using his smartphone device 110 in the morning after waking up. Specifically, user 105 enters his password on the touchscreen display in order to bypass the lock screen. Referring now to FIG. 9, prior to user 105 using his smartphone device, the user was sleeping at block 905. While the user was sleeping, the automated registration service 405 may register default devices 915 since no particular device is currently in use. For example, the default devices may include the smartphone device, home phone, or other device according to implicitly or explicitly expressed user preferences. In response to the user entering the password at block 910, the automated registration service registers the smartphone 110 as now being active at block 920. Alternatively, the smartphone device may maintain its registration if it was already previously registered.

FIG. 10 shows an exemplary scenario 1000 of user 105 interacting with a device 110 in his automobile. For example, at block 1125 in FIG. 11, the user operates the automobile and thereby activates the device 110 incorporated therein. In response, the automated registration service 405 deregisters the smartphone device and registers the automobile device at block 1130. In this scenario, the user operates a map application using the touchscreen display of the device to thereby activate that device. However, in some cases the automobile device may automatically switch on upon the user turning the automobile on, which can thus result in the automobile device registering with the automated registration service 405. Alternatively, the user 105 may play a music application, such as satellite radio, initiate a telephone call, etc. in order to have the automobile device 110 registered with the automated registration service 405. Furthermore, since the smartphone has now been deregistered, any incoming telephone calls may be forwarded directly to the automobile device and be suppressed for receipt at the smartphone.

Figure 12:
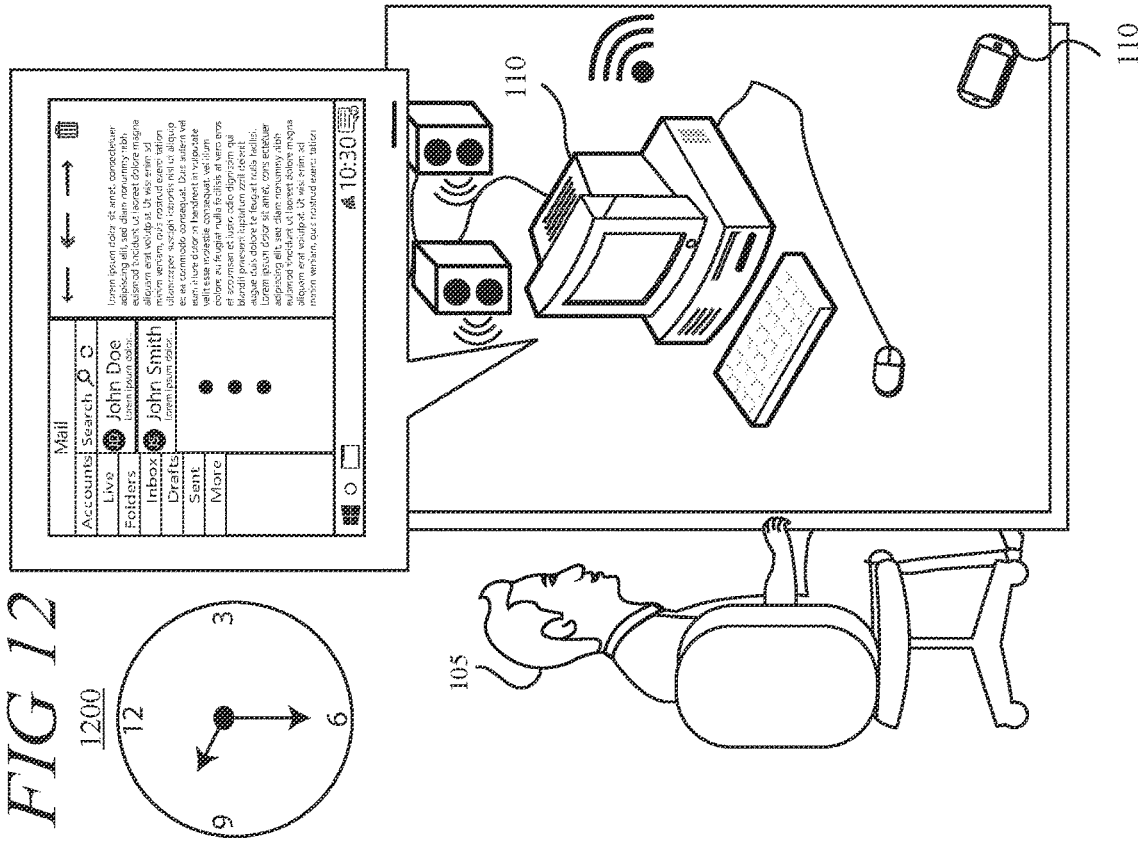
FIG. 12 shows an illustrative user interaction with his work PC (Personal Computer)

FIG. 12 shows an exemplary scenario 1200 of user 105 at work operating a PC (personal computer). Specifically, FIG. 13 indicates at block 1335 that the user 105 has logged into the PC at work and is performing various tasks such as accessing e-mail. In response and after receiving an indication of the activity on the work PC, the automated registration service 405 deregisters the automobile device and registers the work PC at block 1340. Furthermore and as indicated by the ellipsis 1345, the automated registration service may have alternatively deregistered the automobile device upon the user exiting and switching off the automobile (FIG. 10), such as when the user arrived and parked his automobile at work. In that situation, the automated registration service would have deregistered the automobile device and registered the smartphone, even if the user did not operate the smartphone. For example, the automated registration service may have registered the smartphone as a default device, or alternatively by detection of the GPS coordinates of the smartphone changing.

FIG. 14 shows an exemplary scenario 1400 of user 105 exercising (e.g., jogging) while wearing and utilizing wearable device 110. FIG. 15 indicates at block 1550 that the user has activated wearable device 110 by using it during his workout. For example, as shown on display 1460 the wearable device 110 is tracking the user's heartrate during the workout. In addition, the wearable device 110 may be tracking the user's steps, speed, location, calories burned, etc. At block 1555 in FIG. 15 and in response to the user's operation of the wearable device, the automated registration service 405 deregisters the user's work PC and registers the wearable device. If the wearable device is configured with telephony capabilities and can access the IMS core network 250 (FIGS. 2-3), then the automated registration service may only register the wearable device. Alternatively, if the wearable device is an accessory to a smartphone such that the wearable device needs to be connected (e.g., via Bluetooth®) to the smartphone to enable telephony capabilities, then the automated registration service may only register the smartphone. In this case, any incoming calls to the smartphone can be automatically mirrored to the wearable device.

FIG. 16 shows an example 1600 of user 105 operating a tablet device 110 at a coffee shop. In this scenario, the user is using the tablet by browsing the World Wide Web in a browser application, as indicated at block 1765 in FIG. 17. In response, at block 1770 the automated registration service 405 deregisters the wearable device, work PC, and smartphone, and registers the tablet. In addition and as indicated by the ellipses 1775 and 1780, the automated registration service may have previously deregistered the wearable device and work PC when the user left work and, for example, drove his automobile to the coffee shop. In such scenario, the automated registration service may have deregistered the work PC after being inactive for a threshold period of time and registered the automobile device when the user's automobile device was switched on.

Figure 18:
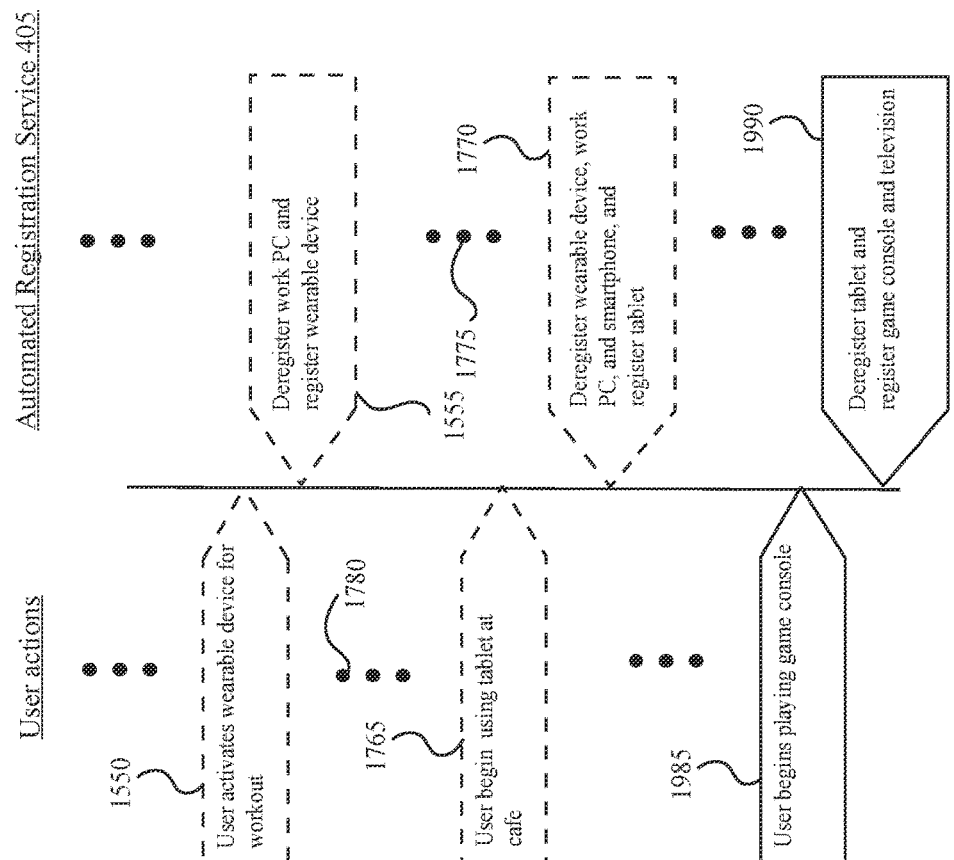
FIG. 18 shows an illustrative user interaction with his game console and television.
Figure 19:
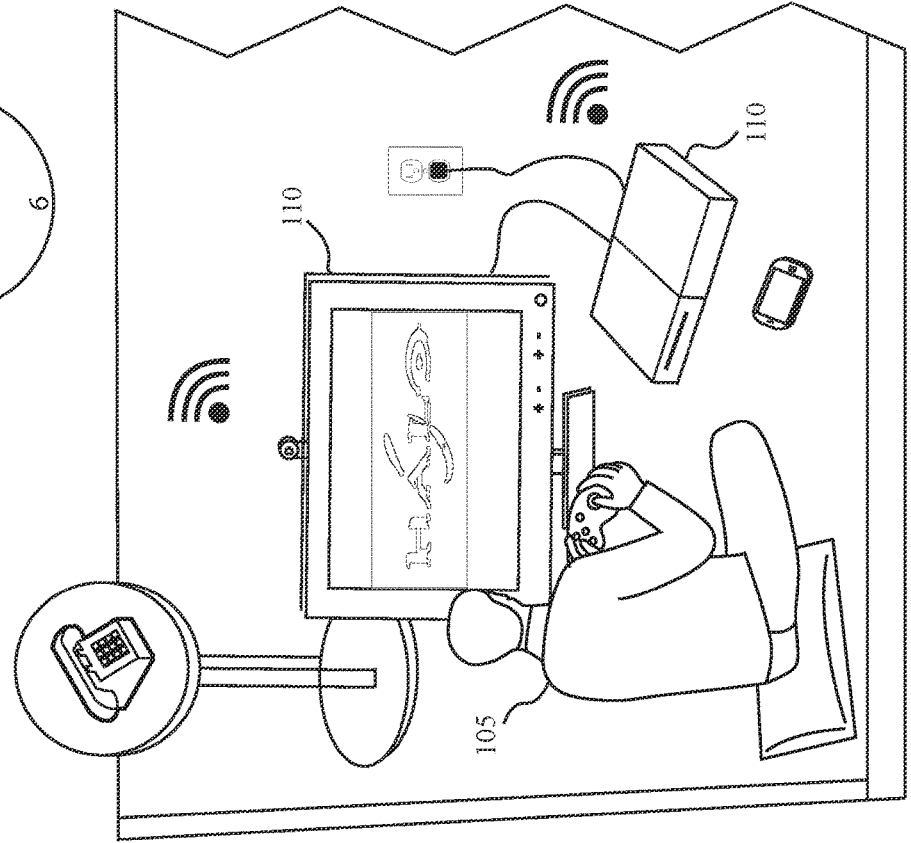
FIG. 19 shows the processes of the automated registration service performed in response to the user interaction of FIG. 18.

FIG. 18 shows an exemplary scenario 1800 of user 105 playing a game console device 110, which is connected to a television. As shown in FIG. 19, at block 1985 the user 105 is playing his game console device 110. In response, at block 1990 the automated registration service 405 deregisters the tablet computer that was previously used at the coffee shop from FIG. 16, and registers the game console and television. In this scenario, should the user receive an incoming call, then the automated registration service may direct the call to the game console and/or the television, so long as both devices include telephony capabilities as described above. In addition, since the user is now home, the automated registration service may likewise register the user's home phone device. The user's presence at home may have been identified by the actions of the user logging in on the game console or television, the user's smartphone connecting to the home Wi-Fi router, or the GPS in the user's smartphone, tablet computer, or automobile devices showing the user at home. The use of the user's location to register devices is an example of contextual information (FIGS. 7A-B), which did not require user interaction with the device. Thus, even actions by the user that are not performed directly on the device may be used to register/deregister a device.

In addition to the automated registration service 405 registering and deregistering devices associated with user 105, the automated registration service 405 likewise makes the determination as to which devices, whether registered or not, to forward the incoming call to, based on contextual information that may be collected and/or utilized in real time. FIG. 20 provides a high-level diagram 2000 that illustrates the differences between the intelligent determination performed by the automated registration service 405 and a generic application server 2005. For example, FIG. 20 shows an incoming call 2020 from a caller 205, which is forwarded by the IMS core network 250 to the tablet and laptop devices 110 associated with user 105, but not to the user's smartphone. By comparison, a notification 2025 transmitted over network 210 by application server 2005 (e.g., map application, weather application) is transmitted to all of the devices 110. Identifying portion 2030 shows that the smartphone 110 has only received a notification 2025 represented by the dashed-line arrow, but not the incoming call represented by the solid line arrow.

The present automatic forwarding of incoming calls based on user interaction with devices may utilize intelligent real-time contextual analysis and inferences to identify devices to receive incoming video and/or audio calls while reducing bandwidth and data consumption on the associated network. An incoming video and/or audio call typically are in real time and attract the user's immediate attention (i.e., so the user can answer the call), so it may be beneficial to the user for the incoming calls to be forwarded to appropriate devices. The real-time call may be in actual time or virtually actual time.

By contrast, notifications do not typically take up significant bandwidth or data, nor do they require a user's immediate attention or acknowledgement. For instance, a notification may remain on the user's device whether the user acknowledges the notification or not. In contrast, if the call is not attended to by the user, then the call may end after a certain amount of time or rings. Further, if the user fails to answer an incoming call then the user may receive a notification of the missed call. Furthermore, notifications will generally be generated from a server, such as application server 2005 of FIG. 20, and transmitted over a conventional data network. Calls, by contrast, are generated by a user directly interacting with a phone over a PSTN (e.g., conventional home phones over telephone lines), or an IP network (e.g., a VoIP service operating over Wi-Fi), and are routed through the IMS core network 250 as described above (FIGS. 2-3).

FIG. 21A shows an illustrative system and method 2100 of one or more users placing an outgoing call to user 105, and the associated processes performed by the automated registration service 405. For example, at step 2105 the automated registration service identifies the registered and deregistered devices. This step may include accessing memory to identify the devices that have been registered and deregistered as explained in the preceding figures (e.g., FIGS. 8-19). At step 2110, the automated registration service identifies the real-time contextual information surrounding the incoming call.

The real-time contextual information can be information that relates to a device implicitly or explicitly. This real-time information can be data that is in actual time or virtually actual time as the data becomes available on the devices. When the information is updated in real time, the determinations made by the automated registration service 405 can be more accurate and useful. Furthermore and as discussed above with respect to FIG. 7A, the contextual information can include data or other information that identifies aspects of the user or the device's and/or the user's environment. For example, geographical location of the user, the user's location based on landmarks or establishments, weather, and status of the user (e.g., temperature, heart rate, exercising, idle, etc.). Examples of real-time contextual information is discussed further below and depicted in FIG. 21B, as illustrated by cut-out 2125. At step 2115, the automated registration service 405 then determines the devices to which to forward the call. In making the determination, the automated registration service 405 may consider the states (i.e., whether active or inactive) of the devices and the real-time contextual information as identified in steps 2105 and 2110. Finally, at step 2120 the automated registration service determines whether or not certain devices should be suppressed such that these devices do not receive the incoming call. For example, devices that are deregistered may not receive an incoming call, unless, for example, the user preferences from the contextual information indicates otherwise.

FIG. 21B shows exemplary real-time contextual information 2150 as described in step 2110 of FIG. 21A. For example, the contextual information 2150 can include whether or not the device is currently in use (e.g., driving in automobile, listening to music on smartphone, using application on tablet) 2155, the amount of time since the device was last used 2160, capabilities of device (e.g., microphone, speakers, battery level, strength of network connectivity, Quality of Service (QoS)) 2165, user preferences (e.g., set default devices, ring certain devices based on context such as caller identity or user location) 2170, calendar data (e.g., upcoming events, scheduled meetings) 2175, contact data (e.g., ring only certain devices based on caller identity) 2180, and location data (e.g., located at home, work, or public venue) 2185, and proximity between devices (e.g., two or more devices are within or beyond a threshold distance to each other) 2190.

FIGS. 22-27 provide illustrative use scenarios of the automated registration service 405 selecting devices to which to forward an incoming call. The selection decision may be based on the method and contextual information illustrated in FIGS. 21A-B. As shown, the various contextual information that can be considered by the automated registration service 405 includes whether the device is currently in use 2205, time since device was last used 2210, capabilities of device 2215, user preferences 2220, calendar data 2225, contact data 2230, and location data 2235.

Although certain context categories are listed in the various figures, it may be understood that additional or alternative context and/or context categories may be considered as well, and the decisions rendered by the automated registration service 405 may also differ according to the particular system and algorithms implemented. For example, in one embodiment the automated registration service may forward a call to a registered tablet computer if the tablet computer has 10% battery life remaining, while in another embodiment the call may not be forwarded to the registered tablet computer when at 10% battery life (i.e., both embodiments differ as to the sufficiency of battery life to receive a call). Furthermore, the various use scenarios depicted in FIGS. 22-27 are based on the various scenarios depicted in FIGS. 8-19.

Furthermore, the devices may be configured to allow user input to activate particular devices or transfer calls from one device to another, which thereby overrides the automated actions performed by the service. For example, if a home phone is deregistered or suppressed, then the user can activate the home phone with a command or other input (e.g., gesture, voice command, physical interaction, etc.).

Each device can arrange a user interface to allow the user to register or deregister particular devices and select particular devices to receive incoming calls or to suppress devices. The user can adjust these user preferences in real-time while a call is in progress or when no call is in progress. In another illustrative embodiment, the user can use a gesture with a device when a call is in progress (e.g., incoming call) to thereby transfer the in-progress call to another device. For example, if the service directs a call to the user's smartphone but not the tablet, then the user can provide input to the smartphone to transfer the call to the tablet so that the tablet rings. For example, the user can point the smartphone toward the tablet like a wand to transfer the call. If a gesture or other input from the user is utilized to transfer the call, then one or both devices may display a prompt to verify the user wishes to transfer the call. With the user's verification, a signal may be sent to the service to transfer the call or otherwise ring the tablet.

Figure 22:
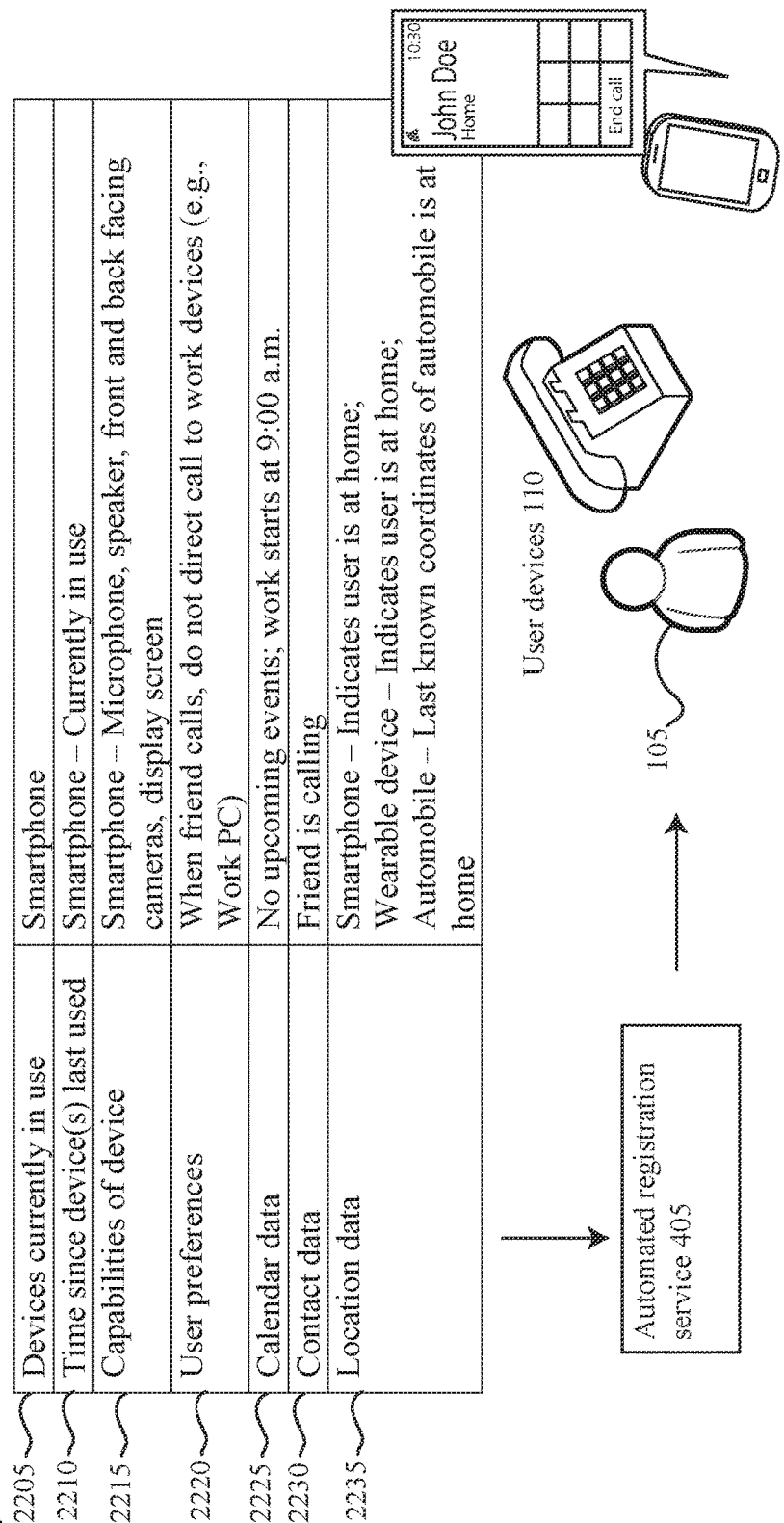

FIG. 22 is based on a use scenario 2200 depicted in FIGS. 8-9 (i.e., the user 105 is at home using his smartphone). As shown, a friend is calling user 105 from his home phone. The various context information that can be considered by the automated registration service includes whether the device is currently in use 2205, time since device was last used 2210, capabilities of device 2215, user preferences 2220, calendar data 2225, contact data 2230, and location data 2235.

In this scenario, the smartphone is currently in use (e.g., the user correctly entered his password to bypass the lock screen), the smartphone is equipped with a microphone, speaker, front and rear facing cameras, and a display screen. The user preferences are set to not direct any calls to work devices (e.g., work PC), work starts at 9:00 a.m., a friend is calling, and the various devices owned by the user indicate that the user is at home.

In view of the real-time contextual information, the automated registration service 405 may route the incoming call to the user's smartphone because it is registered as being in use, as illustrated on display 2205. Furthermore, since the automated registration service can infer that the user is at home based on his location, the service can also enable the home phone to receive the call. Alternatively, the service may enable the home phone because the user's smartphone is now within a threshold proximate distance to the home phone. Incoming calls may be suppressed at other devices that are not in use. In addition, since the user preferences indicate that the user does not want calls from friends being directed to work devices, the automated registration service may suppress ringing at a work PC. Alternatively, the automated registration service may suppress directing the incoming call to the work PC altogether.

FIG. 23 is based on a use scenario 2300 of FIGS. 10-11 (e.g., the user is in his automobile driving). As shown, the user's wife is calling user 105 from her smartphone. In this use scenario, the exemplary contextual information indicates that the automobile device is currently in use; the smartphone has not been used in 3 minutes; the automobile device includes a microphone, speaker, and display; the smartphone is configured similarly as discussed above; the user preferences indicate that when the automobile device is registered, then calls may be directed to the user's automobile device and not smartphone; work starts at 9:00 a.m.; that it is the user's wife who is calling; and the user's smartphone and automobile device indicate that the user is currently in motion in his automobile.

In view of the contextual information, the automated registration service 405 directs the call to the user's automobile device, as illustrated on display 2310. For example, in this scenario because the location data indicates that the user is in his automobile and his preferences are set to direct incoming calls to the user's automobile device, the automated registration service 405 directs the incoming call from his wife to his automobile device. Furthermore, the automated registration service 405 suppresses the call from ringing the user's smartphone since he is driving, in accordance with the user preferences.

Figure 13:
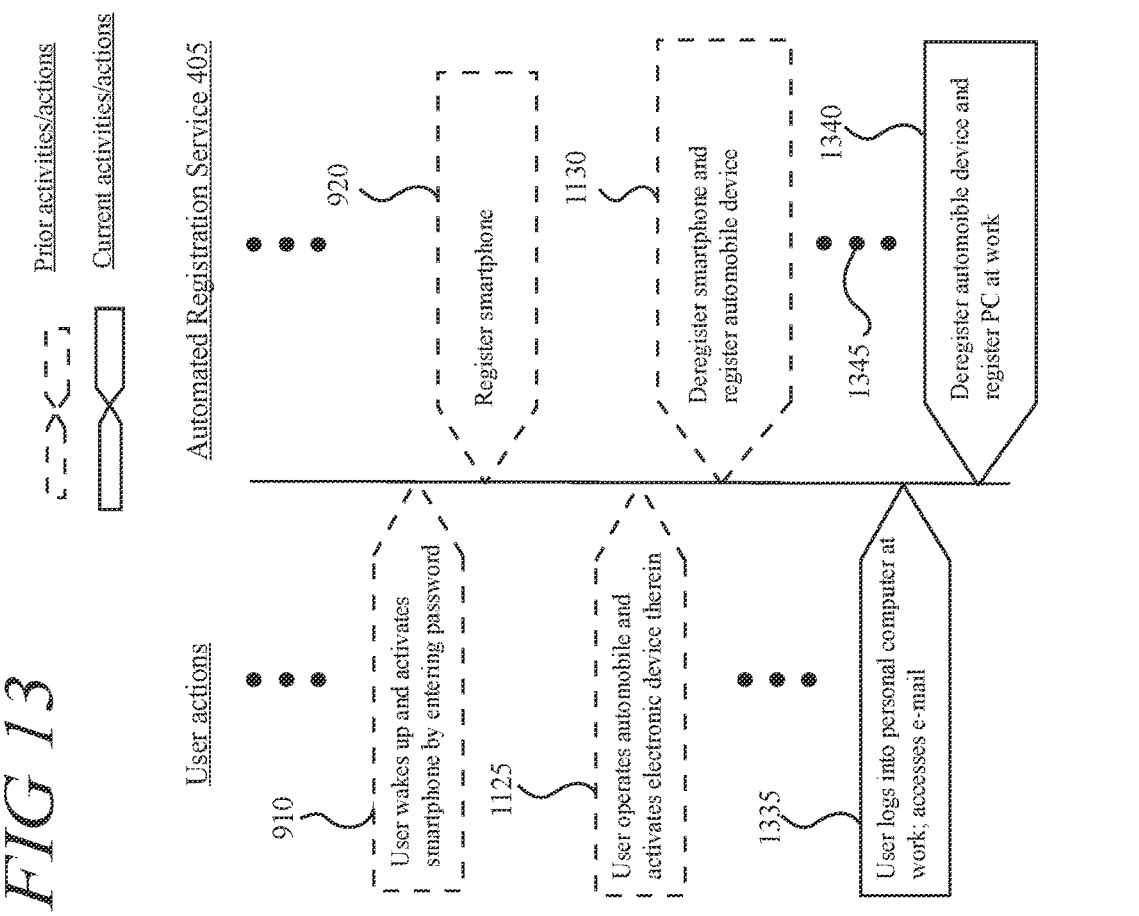
FIG. 13 shows the processes of the automated registration service performed in response to the user interaction of FIG. 12.

FIG. 24 is based on a use scenario 2400 of FIGS. 12-13 (e.g., the user is operating his work PC at work). As shown, the user's co-worker is calling user 105 from her PC. In this use scenario, the exemplary contextual information indicates that the user is currently using his work PC; the smartphone and automobile devices have not been used for two minutes and 10 minutes, respectively; the work PC is equipped with a microphone, speaker, and display screen; the smartphone and automobile devices are configured similarly as discussed above; there is a meeting in the boardroom in five minutes; a co-worker is calling; and the user's smartphone and automobile indicate that the user is located at his work address.

In view of the contextual information, the automated registration service 405 may forward the phone call to the user's work PC, as shown on display 2415, and the user's smartphone, but suppress the user's automobile device from receiving the incoming call. For example, since the user is currently using his work PC and is located at work, the automated registration service may forward the call to the work PC. In addition, given that the calendar indicates that the user has a boardroom meeting in five minutes, the automated registration service may also direct the incoming call to the user's smartphone. That way, the user can select which device is preferred for the call given the imminent meeting (e.g., the user can answer the phone on his walk to the boardroom).

FIG. 25 is based on a use scenario 2500 of FIGS. 14-15 (e.g., the user is exercising with his wearable band). As shown, the user's co-worker is calling the user 105 from his work PC. In this use scenario 2500, the exemplary contextual information indicates that the user 105 is currently using his wearable band; the smartphone has not been used in 10 minutes and the work PC has not been used in 25 minutes; the wearable band is equipped with a microphone, speaker, and display screen; the work PC and smartphone are configured similarly as discussed above; the user has a meeting with a co-worker in one hour; it is the co-worker who is calling; and the user's smartphone, wearable device, and automobile device indicate that the user is at work.

In view of the contextual information, the automated registration service 405 may forward the phone call to the user's wearable band (as illustrated on display 2520) and smartphone, but suppress the call at the user's work PC. Depending on the capabilities of the wearable band to receive incoming calls without a connection (e.g., Bluetooth®) to the smartphone, the incoming call may be forwarded to the smartphone and wearable band, or just the wearable band.

The automated registration service 405 may suppress receipt of incoming calls at other devices that are not in use, such as the user's work PC. For example, the work PC may have been deregistered since it has been 25 minutes since the user has used it. Additionally, the various sensors (e.g., accelerometer, gyroscope, GPS) of the user's wearable band and smartphone may indicate that the user is currently exercising and therefore not using his work PC. Alternatively, since the user is still located at work (e.g., using gym at work), the automated registration service 405 may maintain the registration of the work PC, but simply elect not to forward the incoming call to the work PC due to inactivity. Alternatively, the service may decide to not forward the call to the work PC because the work PC and the wearable band or smartphone are beyond a threshold proximate distance from the work PC. In addition, the contextual information indicates that the user has a meeting with the co-worker in one hour and it is that co-worker who is calling. The automated registration service may utilize this information to maintain the registration of the user's work PC. But as the work PC has not been used for 25 minutes and the user is currently away from the work PC, the service may suppress forwarding of the incoming call to the work PC.

Figure 26:
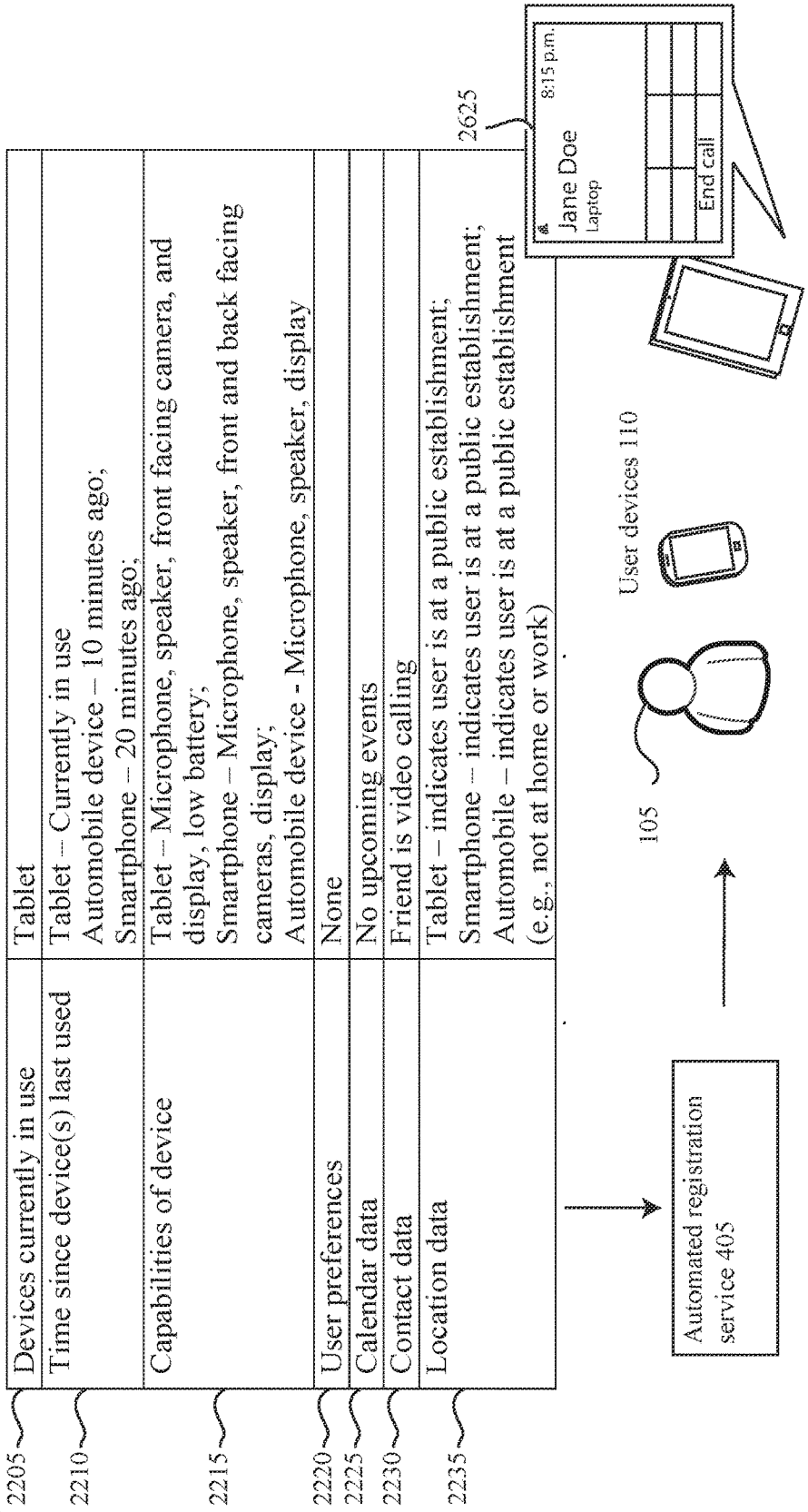

FIG. 26 is based on a use scenario 2600 of FIGS. 16-17 (e.g., the user is at a coffee shop using his tablet). As shown, the user's co-worker is calling the user 105 from a personal laptop. In this use scenario 2600, the exemplary contextual information indicates that the tablet computer is currently in use, the automobile device was last used 10 minutes ago and the smartphone was last used 20 minutes ago; the tablet is equipped with a microphone, speaker, front-facing camera, display, and has a low level of battery power; the smartphone and automobile devices are equipped similarly as discussed above; there are no upcoming events; a friend is calling; and the tablet computer, smartphone, and automobile device (when automobile was on) indicate that the user is at a public venue.

In view of the contextual information, the incoming video call may be forwarded to the user's tablet computer, as illustrated on display 2625 to take the video call since the tablet computer can engage in video communication in view of its front-facing camera, speakers, and microphone. Alternatively, since the user's tablet has low battery power remaining, the automated registration service 405 may make a determination to forward the incoming call to the user's smartphone while preventing the call from being forwarded to the user's tablet to conserve the remaining battery power. As another alternative, the call may be forwarded to both the smartphone and the tablet computer, with an additional indication shown on the displays of one or both devices that the user's tablet is low on battery power (not shown). Furthermore, even though the automobile device has been used more recently than the smartphone, the service can conclude that the automobile was utilized to travel to the coffee shop and is now switched off. The automated registration service can thus suppress the incoming call to the automobile device, and the automobile device may likewise be deregistered.

FIG. 27 is based on a use scenario 2700 of FIGS. 18-19 (e.g., the user is at home playing his game console on his television). As shown, the user's friend is video calling the user 105 from his own game console and television. In this use scenario 2700, the exemplary contextual information indicates that the user's game console and television are both currently in use; the smartphone had been used one minute ago; the game console is connected to the television and together both devices provide microphone, speaker, webcam, and a display; the smartphone and home phone are configured similarly as discussed above; the user has no preferences nor upcoming events in his calendar; it is the user's friend who is calling; and the game console and smartphone indicate that the user is located at home.

In view of the contextual information, the game console, television, smartphone, and home phone may be registered with the automated registration service 405 and other devices may be deregistered. For example, since the user is home, the home phone is registered, and the user is currently using the television and game console, these currently-utilized devices can also register with the service. In addition, as the smartphone was used recently (i.e., one minute ago), it may also be registered for the time being. The incoming video call may be forwarded to the user's smartphone, game console, and television since these devices are all currently in use and have video capabilities (e.g., the television is connected to the game console, therefore the webcam of the television can be utilized by the game console).

FIG. 27 illustrates display 2730 on the television receiving the incoming call. The incoming call is not forwarded to the home phone since that device is not equipped with video capabilities and has not recently been used. Even if the incoming call was solely an audio call (i.e., not video), the automated registration service 405 may choose to suppress the incoming call to the home phone as well, since that device was not recently used and the user is currently operating the game console and television.

FIG. 28 is a flowchart of an illustrative method 2800 for automatically forwarding incoming phone calls to one or more computing devices associated with a single, commonly-utilized phone number, over the IMS core network. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2805, an indication that one or more computing devices is active based on a user interaction is received. The indication of user interaction was described above with respect to FIG. 7A. In step 2810 the one or more computing devices is then registered based on the received indication of activity. In step 2815 a real-time incoming call is received by a third-party computing device, and the real-time incoming call is directed to a phone number associated with the one or more computing devices. In step 2820 the received incoming call is forwarded to the one or more registered computing devices in real time.

FIG. 29 is a flowchart of an illustrative method 2900 that may be performed by a computer server such as one used as an application server in an IMS core network. In step 2905, user interactions with each of a plurality of computing devices that are configured with telephony capabilities is monitored. In step 2910, device capabilities associated with each of the plurality of computing devices is continuously updated. Exemplary device capabilities are discussed above with respect to FIG. 4. In step 2915, one or more of the computing devices is registered in real time based on the monitored user interactions. In step 2920, an incoming call from a third-party computing device that is directed to a phone number associated with the plurality of computing devices is received. In step 2925, the received incoming call is forwarded to one or more of the registered computing devices based on the continuously updated device capabilities.

Figure 30:
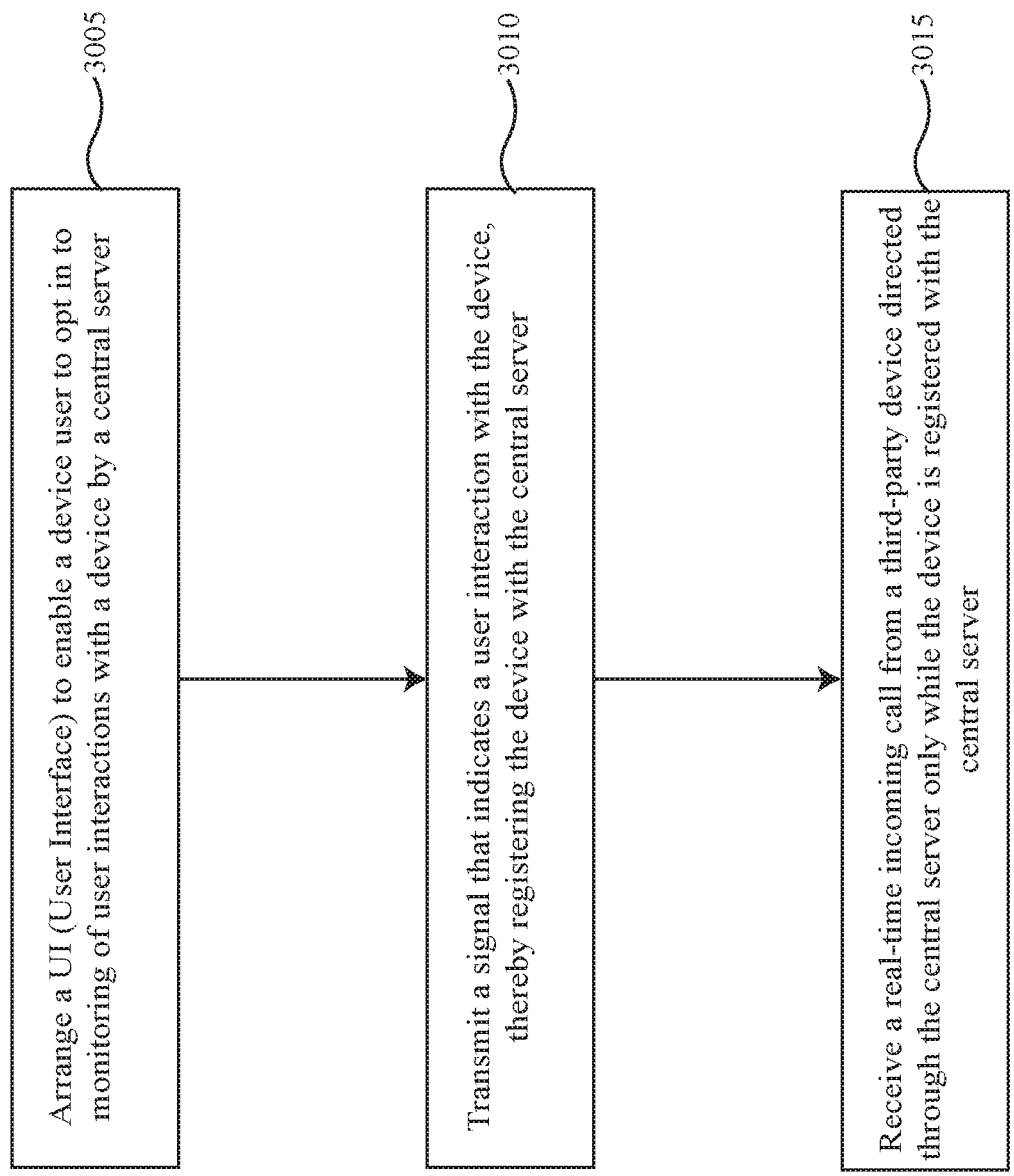
FIG. 30 shows an illustrative method performed by the user device.

FIG. 30 is a flowchart of an illustrative method 3000 that may be performed by a device 110 (FIG. 1). In step 3005 a UI (User Interface) is arranged to enable a user to opt in to monitoring of user interactions with a device by a central server. In step 3010 a signal that indicates a user interaction with the device is transmitted, thereby registering the device with the central server. In step 3015 a real-time incoming call is received from a third-party device, which is directed through the central server only while the device is registered with the central server.

Figure 31:
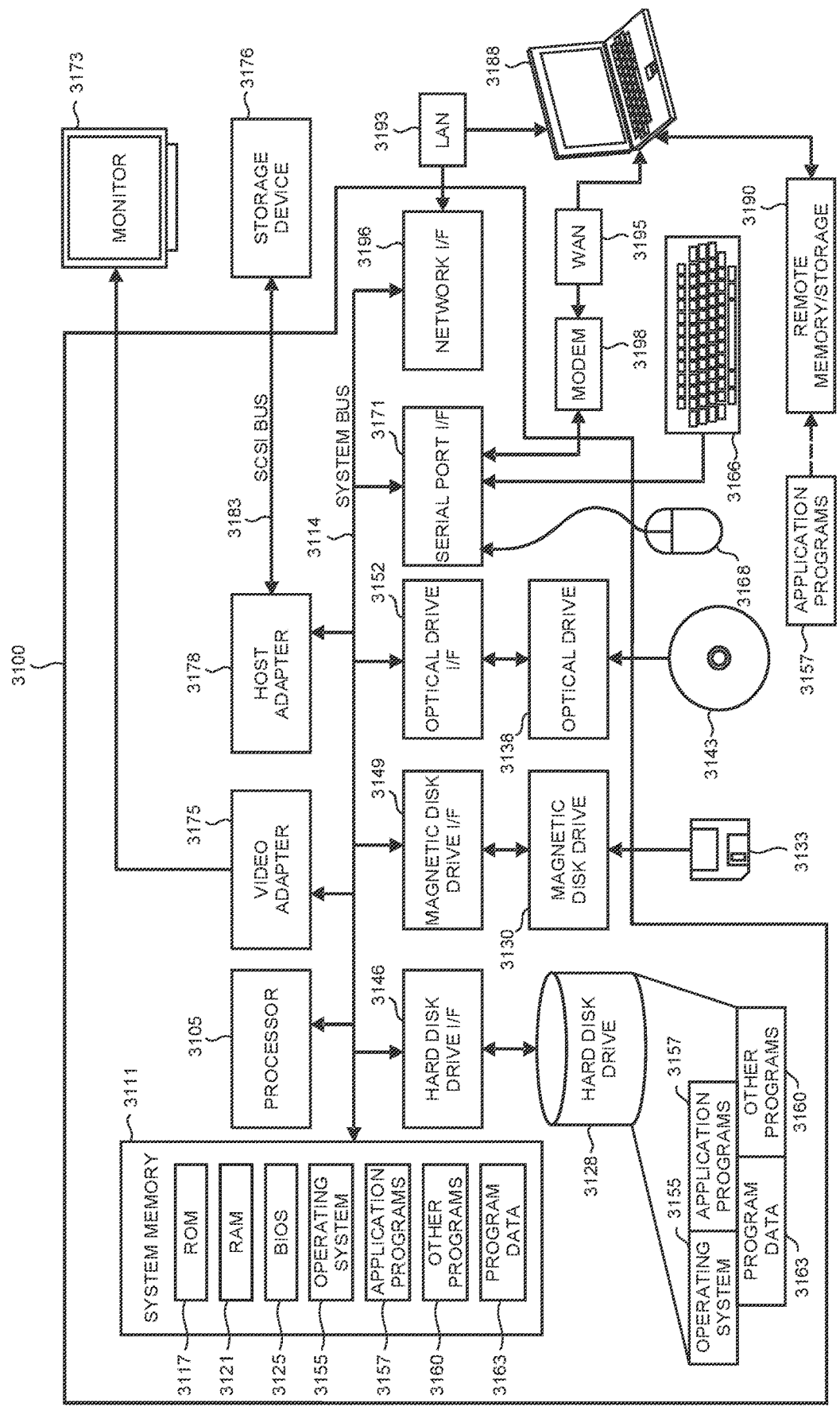
FIG. 31 is a simplified block diagram of an illustrative computer system such as a personal computer (PC) that may be used in part to implement the present forwarding of incoming calls based on user interaction with devices.

FIG. 31 is a simplified block diagram of an illustrative computer system 3100 such as a PC, client machine, or server with which the present automatic forwarding of incoming calls based on user interaction with devices can be implemented. Computer system 3100 includes a processor 3105, a system memory 3111, and a system bus 3114 that couples various system components including the system memory 3111 to the processor 3105. The system bus 3114 may be any of several types of bus structures including a memory bus or memory controller, a peripheral bus, or a local bus using any of a variety of bus architectures. The system memory 3111 includes read only memory (ROM) 3117 and random access memory (RAM) 3121. A basic input/output system (BIOS) 3125, containing the basic routines that help to transfer information between elements within the computer system 3100, such as during startup, is stored in ROM 3117. The computer system 3100 may further include a hard disk drive 3128 for reading from and writing to an internally disposed hard disk (not shown), a magnetic disk drive 3130 for reading from or writing to a removable magnetic disk 3133 (e.g., a floppy disk), and an optical disk drive 3138 for reading from or writing to a removable optical disk 3143 such as a CD (compact disc), DVD (digital versatile disc), or other optical media. The hard disk drive 3128, magnetic disk drive 3130, and optical disk drive 3138 are connected to the system bus 3114 by a hard disk drive interface 3146, a magnetic disk drive interface 3149, and an optical drive interface 3152, respectively. The drives and their associated computer-readable storage media provide non-volatile storage of computer-readable instructions, data structures, program modules, and other data for the computer system 3100. Although this illustrative example includes a hard disk, a removable magnetic disk 3133, and a removable optical disk 3143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automatic forwarding of incoming calls based on user interaction with devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk drive 3128, magnetic disk drive 3130, optical disk drive 3138, ROM 3117, or RAM 3121, including an operating system 3155, one or more application programs 3157, other program modules 3160, and program data 3163. A user may enter commands and information into the computer system 3100 through input devices such as a keyboard 3166 and pointing device 3168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 3105 through a serial port interface 3171 that is coupled to the system bus 3114, but may be connected by other interfaces, such as a parallel port, game port, or universal serial bus (USB). A monitor 3173 or other type of display device is also connected to the system bus 3114 via an interface, such as a video adapter 3175. In addition to the monitor 3173, personal computers typically include other peripheral output devices (not shown), such as speakers and printers. The illustrative example shown in FIG. 31 also includes a host adapter 3178, a Small Computer System Interface (SCSI) bus 3183, and an external storage device 3176 connected to the SCSI bus 3183.

The computer system 3100 is operable in a networked environment using logical connections to one or more remote computers, such as a remote computer 3188. The remote computer 3188 may be selected as another personal computer, a server, a router, a network PC, a peer device, or other common network node, and typically includes many or all of the elements described above relative to the computer system 3100, although only a single representative remote memory/storage device 3190 is shown in FIG. 31. The logical connections depicted in FIG. 31 include a local area network (LAN) 3193 and a wide area network (WAN) 3195. Such networking environments are often deployed, for example, in offices, enterprise-wide computer networks, intranets, and the Internet.

When used in a LAN networking environment, the computer system 3100 is connected to the local area network 3193 through a network interface or adapter 3196. When used in a WAN networking environment, the computer system 3100 typically includes a broadband modem 3198, network gateway, or other means for establishing communications over the wide area network 3195, such as the Internet. The broadband modem 3198, which may be internal or external, is connected to the system bus 3114 via a serial port interface 3171. In a networked environment, program modules related to the computer system 3100, or portions thereof, may be stored in the remote memory storage device 3190. It is noted that the network connections shown in FIG. 31 are illustrative and other means of establishing a communications link between the computers may be used depending on the specific requirements of an application of the present automatic forwarding of incoming calls based on user interaction with devices.

Figure 32:
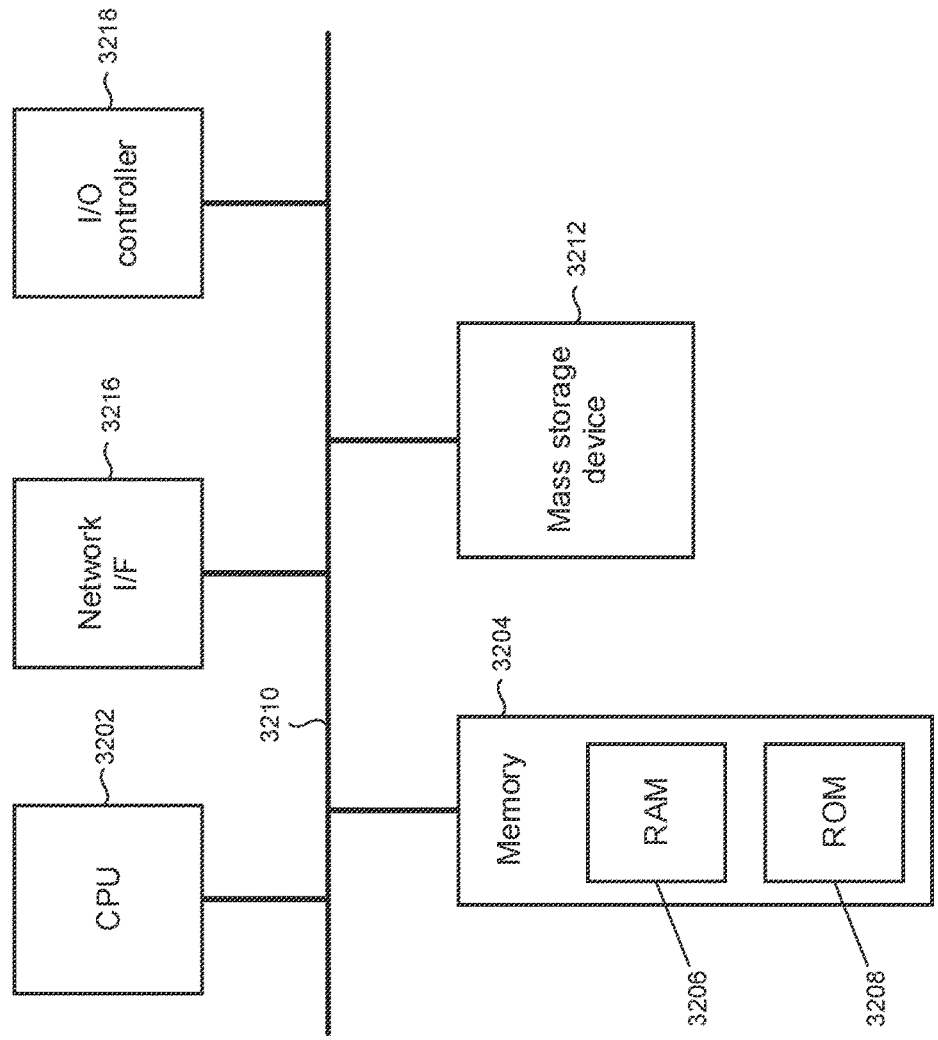
FIG. 32 shows a block diagram of an illustrative device that may be used in part to implement the automatic forwarding of incoming calls based on user interaction with devices.

FIG. 32 shows an illustrative architecture 3200 for a device capable of executing the various components described herein for providing an automatic forwarding of incoming calls based on user interactions. Thus, the architecture 3200 illustrated in FIG. 32 shows an architecture that may be adapted for a server computer, mobile phone, a PDA, a smartphone, a desktop computer, a netbook computer, a tablet computer, GPS device, game console, and/or a laptop computer. The architecture 3200 may be utilized to execute any aspect of the components presented herein. In this regard, the architecture 3200 depicted in FIG. 32 may be utilized to implement the devices 110 and 215 (FIGS. 1-2) and the computer system 3100 depicted in FIG. 31 may be utilized on the application servers 365 to implement the automated registration service 405 (FIG. 4).

The architecture 3200 illustrated in FIG. 32 includes a CPU (Central Processing Unit) 3202, a system memory 3204, including a RAM 3206 and a ROM 3208, and a system bus 3210 that couples the memory 3204 to the CPU 3202. A basic input/output system containing the basic routines that help to transfer information between elements within the architecture 3200, such as during startup, is stored in the ROM 3208. The architecture 3200 further includes a mass storage device 3212 for storing software code or other computer-executed code that is utilized to implement applications, the file system, and the operating system.

The mass storage device 3212 is connected to the CPU 3202 through a mass storage controller (not shown) connected to the bus 3210. The mass storage device 3212 and its associated computer-readable storage media provide non-volatile storage for the architecture 3200.

Although the description of computer-readable storage media contained herein refers to a mass storage device, such as a hard disk or CD-ROM drive, it may be appreciated by those skilled in the art that computer-readable storage media can be any available storage media that can be accessed by the architecture 3200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3200.

According to various embodiments, the architecture 3200 may operate in a networked environment using logical connections to remote computers through a network. The architecture 3200 may connect to the network through a network interface unit 3216 connected to the bus 3210. It may be appreciated that the network interface unit 3216 also may be utilized to connect to other types of networks and remote computer systems. The architecture 3200 also may include an input/output controller 3218 for receiving and processing input from a number of other devices, including a keyboard, mouse, or electronic stylus (not shown in FIG. 32). Similarly, the input/output controller 3218 may provide output to a display screen, a printer, or other type of output device (also not shown in FIG. 32).

It may be appreciated that the software components described herein may, when loaded into the CPU 3202 and executed, transform the CPU 3202 and the overall architecture 3200 from a general-purpose computing system into a special-purpose computing system customized to facilitate the functionality presented herein. The CPU 3202 may be constructed from any number of transistors or other discrete circuit elements, which may individually or collectively assume any number of states. More specifically, the CPU 3202 may operate as a finite-state machine, in response to executable instructions contained within the software modules disclosed herein. These computer-executable instructions may transform the CPU 3202 by specifying how the CPU 3202 transitions between states, thereby transforming the transistors or other discrete hardware elements constituting the CPU 3202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3200 in order to store and execute the software components presented herein. It also may be appreciated that the architecture 3200 may include other types of computing devices, including handheld computers, embedded computer systems, smartphones, PDAs, and other types of computing devices known to those skilled in the art. It is also contemplated that the architecture 3200 may not include all of the components shown in FIG. 32, may include other components that are not explicitly shown in FIG. 32, or may utilize an architecture completely different from that shown in FIG. 32.

Various exemplary embodiments of the present automatic forwarding of incoming calls based on user interaction with devices are now presented by way of illustration and not as an exhaustive list of all embodiments. An example includes a method performed at a server associated with a service to direct incoming calls over a network to one or more computing devices among a plurality of computing devices, the method comprising: associating each of the plurality of computing devices with a commonly utilized phone number, wherein each of the plurality of computing devices is configured with telephony capabilities; receiving from the one or more computing devices an indication to register the one or more computing devices; registering the one or more computing devices based on the received indication, wherein the registering includes assigning the commonly utilized phone number to the one or more registered computing devices; receiving a real-time incoming call directed to the commonly utilized phone number; and determining which of the one or more registered computing devices to forward the call to based on real-time contextual information.

In another example, the indication to register the one or more computing devices is based on whether or not a computing device is active. In another example, the computing device is active when a user interacts with the computing device. In another example, the computing device is active when the computing device is within a threshold proximate distance to a user associated with the commonly-utilized phone number. In another example, the method further comprises deregistering one or more computing devices of the plurality of computing devices based on one or more of lack of interaction at a computing device for a predetermined threshold of time, the computing device entering sleep mode or do-not-disturb mode, and the real-time contextual information. In another example, the method further comprises suppressing one or more of the registered computing devices from receiving the incoming call based on the real-time contextual information. In another example, the real-time contextual information includes one or more of time elapsed since last user interaction, capabilities of computing device, calendar data, contact data of caller associated with incoming call, proximity of one computing device relative to another computing device, or location data for a computing device. In another example, the real-time contextual information related to the capabilities of the computing device includes: whether a computing device includes one or more of a microphone, speaker, front-facing camera, rear-facing camera, and display; and a battery level of the computing device, network connectivity strength of the computing device, performance level of the computing device, or quality of components of the computing device. In another example, the server and the plurality of computing devices communicate over an IMS (Internet Protocol Multimedia Subsystem) network.

A further example includes one or more hardware-based computer-readable memory devices not consisting of propagated signals storing instructions which, when executed by one or more processors disposed in a computer server, cause the computer server to: monitor user interactions with a plurality of computing devices, each of the plurality of computing devices being configured with capabilities including telephony and being associated with a commonly-utilized phone number; register one or more computing devices of the plurality of computing devices based on the monitored user interactions; receive an incoming call from a remote computing device that is directed to the commonly-utilized phone number associated with the plurality of computing devices; and forward the incoming call to the one or more registered computing devices.

In another example, the computer server, the plurality of computing devices, and the remote computing device communicate at least in part over an IMS (Internet Protocol Multimedia Subsystem) core network. In another example, the monitored user interactions include one or more of switching on a computing device, bypassing a lock screen, browsing within the computing device, communicating using the computing device, opening an application, or generating contextual information. In another example, the device capabilities are supported by device components including one or more of a microphone, speaker, front-facing camera, or rear-facing camera, and display, and the device capabilities are further described by device state including one or more of a battery level of the computing device, network connectivity strength, network QoS (quality of service), performance level of the computing device, or quality of components of the computing device. In another example, the executed instructions cause the computer server to deregister one or more computing devices of the plurality of computing devices based on one or more of inactivity at a computing device for a predetermined threshold of time, the computing device switching off, failure to bypass a lock screen, the computing device entering sleep mode or do-not-disturb mode, or real-time contextual information. In another example, the executed instructions cause the computer server to suppress the incoming call from being forwarded to deregistered computing devices. In another example, the executed instructions cause the computer server to bypass the suppression of deregistered computing devices when user preferences are set to direct the incoming call to a particular computing device. In another example, the incoming call is a video call and the real-time contextual information includes device capabilities of a computing device, wherein the control server forwards the incoming call to a registered device equipped with a camera or webcam, and the computer server suppresses a registered device that is not configured with a camera or webcam.

A further example includes a device configured with telephony capabilities and associated with a single phone number that is commonly-shareable with other devices having telephony capabilities, comprising: one or more processors; a user interface (UI) configured to enable interactions with a user of the device; and one or more hardware-based memory devices not consisting of propagated signals storing computer-readable instructions which, when executed by the one or more processors, cause the device to: arrange the UI to enable monitoring of user interaction in which a control server registers and deregisters the device based on the monitored user interactions; transmit a signal to the control server that indicates a user interaction with the device, to thereby register the device with the control server; and when the device is registered with the control server, receive a real-time incoming call from a calling party that is directed through the control server.

In another example, the executed instructions further cause the device to: transmit a signal to the control server that indicates one or more of a user interaction with the device or real-time contextual information associated with the device, the signal causing the control server to deregister the device; and reject the real-time incoming call from the calling party directed through the control server when the device is deregistered with the control server. In another example, the executed instructions further cause the device to: receive input to transfer the real-time incoming call to a second device; and transfer the real-time incoming call to the second device based on the received input, wherein the input overrides a decision from the control server to not forward the real-time incoming call to the second device.

Based on the foregoing, it may be appreciated that technologies for automatic forwarding of incoming calls based on user interactions with devices have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:
1. A method comprising:
  receiving a real-time incoming communication directed to a commonly utilized identifier assigned to each computing device of a plurality of computing devices that is configured for communications over a network;
  collecting real-time contextual information that is associated with each computing device of the plurality of computing devices, the real-time contextual information describing capabilities and a location of a particular computing device of the plurality of computing devices, wherein the capabilities of the particular computing device are dynamically reconfigurable;
  identifying a group of active computing devices based on the real-time contextual information; and
  forwarding the real-time incoming communication to a first active computing device in the group of active computing devices and suppressing the real-time incoming communication from being forwarded to a second active computing device in the group of active computing devices based on of the real-time contextual information.

2. The method of claim 1, wherein the real-time contextual information includes at least one of time elapsed since last user interaction, calendar data, contact data of caller associated with the real-time incoming communication, or a proximity of the particular computing device relative to another computing device of the plurality of computing devices.

3. The method of claim 1, wherein the capabilities include:
whether the particular computing device includes at least one of a microphone, a speaker, a front-facing camera, a rear-facing camera, or a display; and
at least one of a battery level of the particular computing device, a network connectivity strength of the particular computing device, a performance level of the particular computing device, or a quality of components of the particular computing device.

4. The method of claim 1, wherein one or more of the plurality of computing devices communicate over an Internet Protocol Multimedia Subsystem network.

5. The method of claim 1, further comprising receiving an indication of an active status for an individual active computing device in the group of active computing devices.

6. The method of claim 5, wherein the indication provides information about activities being performed on the individual active computing device.

7. The method of claim 5, wherein the individual active computing device has the active status when, responsive to receiving user input, the individual active computing device authenticates a user and a lock screen is bypassed.

8. The method of claim 5, wherein the individual active computing device has the active status when the individual active computing device is within a threshold distance to another individual active computing device in the group of active computing devices.

9. The method of claim 5, further comprising registering the individual computing device as having the active status based on the indication.

10. The method of claim 9, further comprising deregistering the individual active computing device based on at least one of a lack of interaction at the individual active computing device for a predetermined threshold of time, the the individual active computing device entering a sleep mode, or the individual active computing device entering a do-not-disturb mode.

11. One or more non-transitory computer-readable memory devices storing instructions which, when executed by one or more processors disposed in a computing device, cause the computing device to:
receive a real-time incoming communication directed to a commonly utilized identifier assigned to each computing device of a plurality of computing devices that is configured for communications over a network;
collect real-time contextual information that is associated with each computing device of the plurality of computing devices, the real-time contextual information describing capabilities and a location of a particular computing device of the plurality of computing devices, wherein the capabilities the particular computing device are dynamically reconfigurable;
identify a group of active computing devices based on the real-time contextual information; and
forward the real-time incoming communication to a first active computing device in the group of active computing devices and suppress the real-time incoming communication from being forwarded to a second active computing device in the group of active computing devices based on the real-time contextual information.

12. The one or more non-transitory computer-readable memory devices of claim 11, in which the executed instructions further cause the computing device to receive an indication of an active status for an individual active computing device in the group of active computing devices.

13. The one or more non-transitory computer-readable memory devices of claim 12, in which the executed instructions further cause the computing device to register the individual computing device as having the active status based on the indication.

14. The one or more non-transitory computer-readable memory devices of claim 12, wherein the indication of the active status provides information about activities being performed on the individual computing device.

15. The one or more non-transitory computer-readable memory devices of claim 12, wherein the individual computing device has the active status when the individual computing device is within a threshold distance to another individual active computing device in the group of active computing devices.

16. A computing device, comprising:
one or more processors; and
one or more non-transitory memory devices storing computer-readable instructions which, when executed by the one or more processors, cause the computing device to:
receive a real-time incoming communication directed to a commonly utilized identifier assigned to each computing device of a plurality of computing devices that is configured for communications over a network;
collect real-time contextual information that is associated with each computing device of the plurality of computing devices, the real-time contextual information describing capabilities and a location of a particular computing device, wherein the capabilities of the particular computing device are dynamically reconfigurable;
identify a group of active computing devices based on the real-time contextual information; and
forward the real-time incoming communication to a first active computing device in the group of active computing devices and suppress the real-time incoming communication from being forwarded to a second active computing device in the group of active computing devices based on the real-time contextual information.

17. The computing device of claim 16, in which the executed instructions further cause the computing device to receive an indication of an active status for an individual active computing device in the group of active computing devices.

18. The computing device of claim 17, in which the executed instructions further cause the computing device to register the individual computing device as having the active status based on the indication.

19. The computing device of claim 17, wherein the indication provides information about activities being performed on the individual computing device.

20. The computing device of claim 16, wherein the capabilities include:
whether the particular computing device includes at least one of a microphone, a speaker, a front-facing camera, a rear-facing camera, or a display; and at least one of a battery level of the particular computing device, a network connectivity strength of the particular computing device, a performance level of the particular computing device, or a quality of components of the particular computing device.

* * * * *